US008986112B2

(12) United States Patent
Smith

(10) Patent No.: US 8,986,112 B2
(45) Date of Patent: Mar. 24, 2015

(54) SYSTEM AND METHOD FOR DOWNLOADING VIDEO GAME PROGRAMS

(75) Inventor: Darren C. Smith, Redmond, WA (US)

(73) Assignee: Nintendo Co., Ltd., Kyoto (JP)

(*) Notice: Subject to any disclaimer, the term of this patent is extended or adjusted under 35 U.S.C. 154(b) by 280 days.

(21) Appl. No.: 12/588,503

(22) Filed: Oct. 16, 2009

(65) Prior Publication Data
US 2010/0248823 A1 Sep. 30, 2010

Related U.S. Application Data

(60) Division of application No. 12/395,698, filed on Mar. 1, 2009, now abandoned, which is a continuation of application No. 12/216,990, filed on Jul. 14, 2008, now abandoned, which is a continuation of application No. 11/984,543, filed on Nov. 19, 2007, now abandoned.

(60) Provisional application No. 60/859,487, filed on Nov. 17, 2006.

(51) Int. Cl.
A63F 13/323 (2014.01)
A63F 13/30 (2014.01)

(52) U.S. Cl.
CPC ........... A63F 13/12 (2013.01); A63F 2300/552 (2013.01)
USPC .............................. 463/29; 463/43

(58) Field of Classification Search
CPC .. A63F 13/22; A63F 13/23; A63F 2300/1025
USPC ......................... 463/29, 43, 36, 37
See application file for complete search history.

(56) References Cited

U.S. PATENT DOCUMENTS

| 4,570,930 A | 2/1986 | Matheson |
| 4,903,218 A | 2/1990 | Longo et al. |
| 5,005,122 A | 4/1991 | Griffin et al. |
| 5,051,822 A | 9/1991 | Rhoades |
| 5,083,800 A | 1/1992 | Lockton |

(Continued)

FOREIGN PATENT DOCUMENTS

| EP | 0 918 298 A1 | 5/1999 |
| JP | 04-113865 | 4/1992 |

(Continued)

OTHER PUBLICATIONS

German Office Action with English translation issued for corresponding German Patent Application No. 101 13 514.9-53, dated Oct. 15, 2010 (13 pages total).
Seamus Ross et al., "Digital Archaeology: Rescuing Neglected and Damaged Data Resources", A JISC/NPO Study within the Electronic Libraries (eLib) Programme on the Preservation of Electronic Materials, Library Information Technology Centre, London, Feb. 1999.

(Continued)

Primary Examiner — Damon Pierce
Assistant Examiner — Allen Chan
(74) Attorney, Agent, or Firm — Nixon & Vanderhye P.C.

(57) ABSTRACT

An example video game program download system and method apparatus for downloading a video game program to a target video game platform in which a processing system receives a download request from the target video game platform requesting downloading of a video game program that executes on a native video game platform different than the target video game platform. In response thereto, the requested video game program is sent along with a program for providing compatibility between the target and native video game platforms.

21 Claims, 32 Drawing Sheets

(56) References Cited

U.S. PATENT DOCUMENTS

| | | | |
|---|---|---|---|
| 5,149,104 A | 9/1992 | Edelstein | |
| 5,251,909 A | 10/1993 | Reed et al. | |
| 5,342,047 A * | 8/1994 | Heidel et al. | 463/29 |
| 5,404,527 A | 4/1995 | Irwin et al. | |
| 5,412,800 A | 5/1995 | Bril et al. | |
| 5,448,263 A | 9/1995 | Martin | |
| 5,497,479 A | 3/1996 | Hornbuckle | |
| 5,552,799 A | 9/1996 | Hashiguchi | |
| 5,575,717 A | 11/1996 | Houriet, Jr. et al. | |
| 5,577,180 A | 11/1996 | Reed | |
| RE35,520 E | 5/1997 | Darling et al. | |
| 5,667,440 A | 9/1997 | Sasaki et al. | |
| 5,807,173 A | 9/1998 | Aoyama | |
| 5,880,974 A | 3/1999 | Tarumi et al. | |
| 5,892,939 A | 4/1999 | Call et al. | |
| 5,959,596 A | 9/1999 | McCarten et al. | |
| 5,961,385 A | 10/1999 | Aoyama et al. | |
| 5,964,660 A | 10/1999 | James et al. | |
| 5,984,783 A | 11/1999 | Kikuchi et al. | |
| 5,984,786 A | 11/1999 | Ehrman | |
| 5,993,319 A | 11/1999 | Aoyama | |
| 6,009,458 A | 12/1999 | Hawkins et al. | |
| 6,015,348 A | 1/2000 | Lambright et al. | |
| 6,024,643 A | 2/2000 | Begis | |
| 6,044,408 A | 3/2000 | Engstrom et al. | |
| 6,056,640 A | 5/2000 | Schaaij | |
| 6,102,796 A | 8/2000 | Pajitnov et al. | |
| 6,106,395 A | 8/2000 | Begis | |
| 6,106,399 A | 8/2000 | Baker et al. | |
| 6,115,054 A | 9/2000 | Giles | |
| 6,132,315 A | 10/2000 | Miyamoto et al. | |
| 6,165,068 A | 12/2000 | Sonoda et al. | |
| 6,166,732 A | 12/2000 | Mitchell et al. | |
| 6,179,713 B1 | 1/2001 | James et al. | |
| 6,183,364 B1 | 2/2001 | Trovato | |
| 6,238,290 B1 | 5/2001 | Tarr et al. | |
| 6,238,291 B1 | 5/2001 | Fujimoto et al. | |
| 6,253,167 B1 | 6/2001 | Matsuda et al. | |
| 6,468,160 B2 | 10/2002 | Eliott | |
| 6,478,679 B1 | 11/2002 | Himoto et al. | |
| 6,672,963 B1 | 1/2004 | Link | |
| 6,884,171 B2 | 4/2005 | Eck et al. | |
| 6,951,516 B1 | 10/2005 | Eguchi et al. | |
| 6,955,606 B2 | 10/2005 | Taho et al. | |
| 7,285,051 B2 | 10/2007 | Eguchi et al. | |
| 7,338,376 B2 | 3/2008 | Eck et al. | |
| 7,465,231 B2 | 12/2008 | Lewin et al. | |
| 8,187,099 B2 | 5/2012 | Taho et al. | |
| 2001/0029205 A1 | 10/2001 | Taho et al. | |
| 2001/0031665 A1* | 10/2001 | Taho et al. | 463/43 |
| 2004/0005928 A1* | 1/2004 | Eguchi et al. | 463/43 |
| 2004/0157664 A1* | 8/2004 | Link | 463/43 |
| 2005/0272504 A1 | 12/2005 | Eguchi et al. | |
| 2006/0009290 A1 | 1/2006 | Taho et al. | |
| 2006/0046819 A1* | 3/2006 | Nguyen et al. | 463/16 |
| 2006/0061571 A1 | 3/2006 | Nomura et al. | |

FOREIGN PATENT DOCUMENTS

| | | |
|---|---|---|
| JP | 05-181673 | 7/1993 |
| JP | 05-210786 | 8/1993 |
| JP | 05-324527 | 12/1993 |
| JP | 06-091055 | 4/1994 |
| JP | 08-272712 | 10/1996 |
| JP | 09-070483 | 3/1997 |
| JP | 09-153904 | 6/1997 |
| JP | 09-294260 | 11/1997 |
| JP | 10-091371 | 4/1998 |
| JP | 10-099544 | 4/1998 |
| JP | 10-137447 | 5/1998 |
| JP | 10-165649 | 6/1998 |
| JP | 10-201947 | 8/1998 |
| JP | 11-039242 | 2/1999 |
| JP | 11-197361 | 7/1999 |
| JP | 11-207034 | 8/1999 |
| JP | 11-319314 | 11/1999 |
| JP | 2006-018476 | 1/2006 |
| WO | 98/29974 | 7/1998 |
| WO | WO 2006100540 A1 * | 9/2006 |

OTHER PUBLICATIONS

Jeff Rothenberg, "Avoiding Technological Quicksand: Finding a Viable Technical Foundation for Digital Preservation," Council on Libary and Information Resources, Washington, DC, Jan. 1999.

Wikipedia article on MAC Address, http://en.wikipedia.org/wiki/MAC_address.

"Cross use of recording medium by utilizing utility," Nikkei Personal Computing, 1999, w/partial English translation (7 pages total).

"Learn the basics of browser", Easy PC in action, Part 105, Mar. 28, 2000, w/partial English translation (9 pages total).

"Hybrid", Nikkei Mac, Apr. 2000, w/partial English translation (6 pages total).

List of Emulators, Wikipedia, http://en.wikipedia.org/w/index.php?title=List_of_emulators.

Console Emulator, Wikipedia, http://en.wikipedia. org/w/index.php?title=Console_emulator.

Directory Listing of /~gator/mame, http://user.cs/tu-berlin.de/~gator/mame.

Frontends, http://www.mame.net/frontend.html.

FAQ, http://www.mame.net/mamefaq.html.

Gamelist.txt, http://www.mame.net/gamelist.html.

Gauntlet, http://en.wikipedia.org/wiki/Gauntlet_(game).

Mame32 Overview, http://www.classicgaming.com/mame32qa/help/mame32_overview.htm.

Mame, http://www.mame.net/, 1997.

mame.txt, http://www.mame.net/readme.html.

Shih, Ming-yu, Readmee.txt, "SMYGB—Game Boy Emulator v0.20," (smy@ip.csie.ncu.edu.tw), HTTP://www.billyjr.com/smygb/ (Jan. 2, 1999).

"Snarkofagen's Emulation, The Latest Emulator News," HTTP://home.swipnet.se/snarkofagen/, (Nov. 15, 1999 to Dec. 29, 1999).

"No$GMB—version 2.5, nocash gameboy emulator/debugger for dos/windows" HTTP://www.work.de/nocash/gmb.htm.

"Welcome to my Vgb page," HTTP://elektron.et.tudelft.nl/~jdegoede/vgb.html.

Bleem! TM, Play hundreds of Playstation Games on Your PC, © 1998-1999.

Windows.txt, http://www.mame.net/readmewin.html.

MAME (http://web.archive.org/web/20000815230042/http://mame.net/readme.html) Aug. 15, 2000.

Donkey Kong 64 FAQ Jan. 29, 2000; http://db.gamefaqs.com/console/n64/file/donkey_kong_64_c_do_not_link_directly_to_this_file_or_any_others.txt.

Sample of remainder of print-out of Archive Games-U from www.worldofspectrum.org/games/u.html—1 page cover sheet, printed Nov. 27, 2001.

www.worldofspectrum.org/permits/, website and sample pp. 1 and 2 of 6, printed Nov. 27, 2001.

www.worldofspectrum.org/emulators.html, website and sample p. 1 of 7, printed Nov. 28, 2001.

www.worldofspectrum.org/games/u.html, website and sample p. 1 of 2, printed Nov. 28, 2001.

MAME—The Official Multiple Arcade Machine Emulator Site, HTTP://www.mame.net, mame.net Copyright, 1997-2002 the MAME team, pp. 1-4.

Great Britain Search Report issued for corresponding GB Application No. 0104876.8, dated Nov. 29, 2001.

U.S. Appl. No. 11/205,324, Taho et al., filed Aug. 17, 2005.

U.S. Appl. No. 10/408,662, Eguchi et al., filed Apr. 8, 2003.

U.S. Appl. No. 09/774,660, Taho et al., filed Jan. 19, 2001.

Office Action in corresponding Japanese Patent Application No. 2009-537231 dated Mar. 5, 2013.

Japanese Office Action dated Sep. 19, 2013 in corresponding Japanese Application No. 2009-537231.

* cited by examiner

NON-LIMITING
EXAMPLE VIDEO GAME
DOWNLOAD SYSTEM

NON-LIMITING
EXAMPLE VIDEO GAME SYSTEM 102

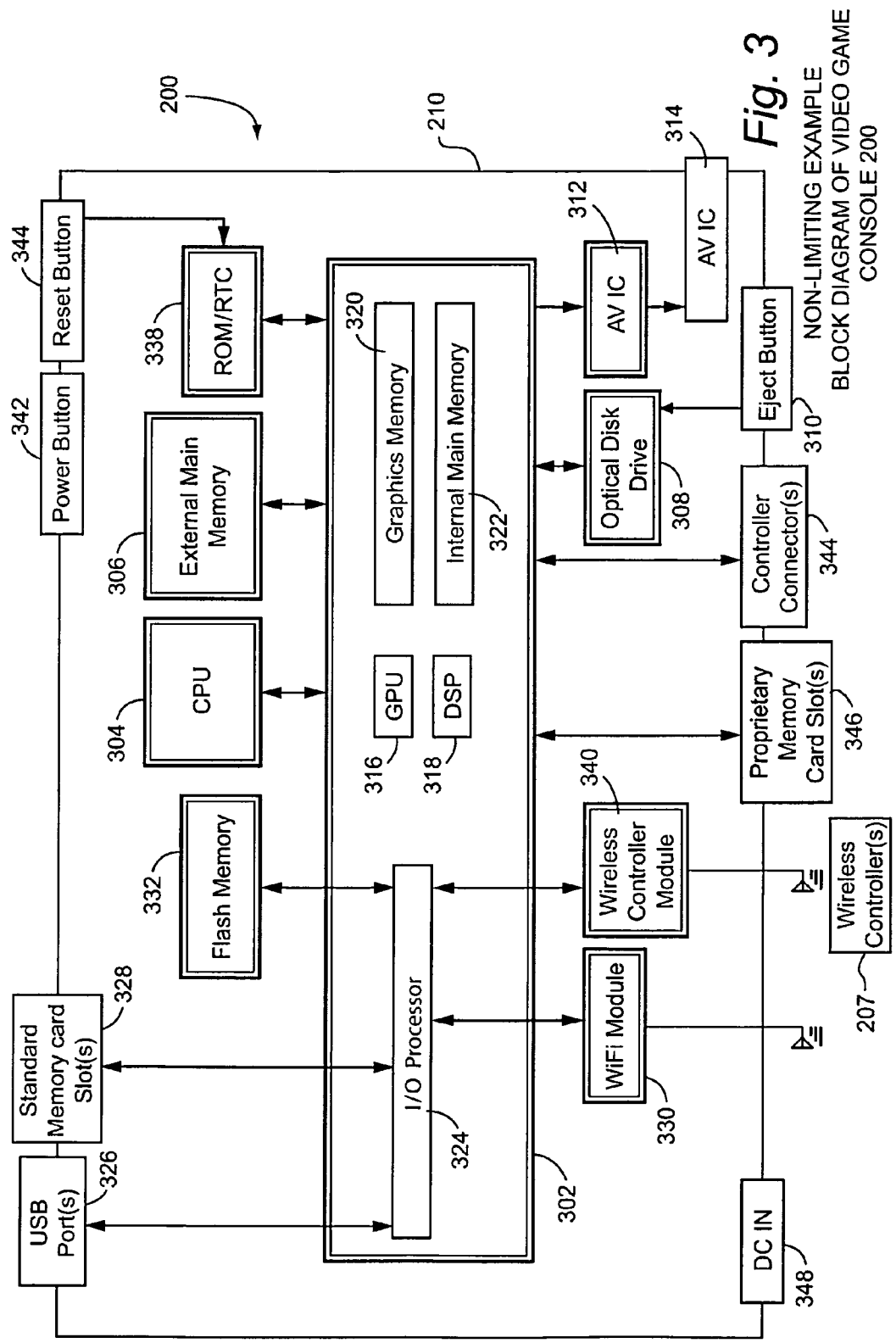

NON-LIMITING
EXAMPLE CONTROLLER 207

NON-LIMITING
EXAMPLE CONTROLLER 207

NON-LIMITING
EXAMPLE CONTROLLER 207

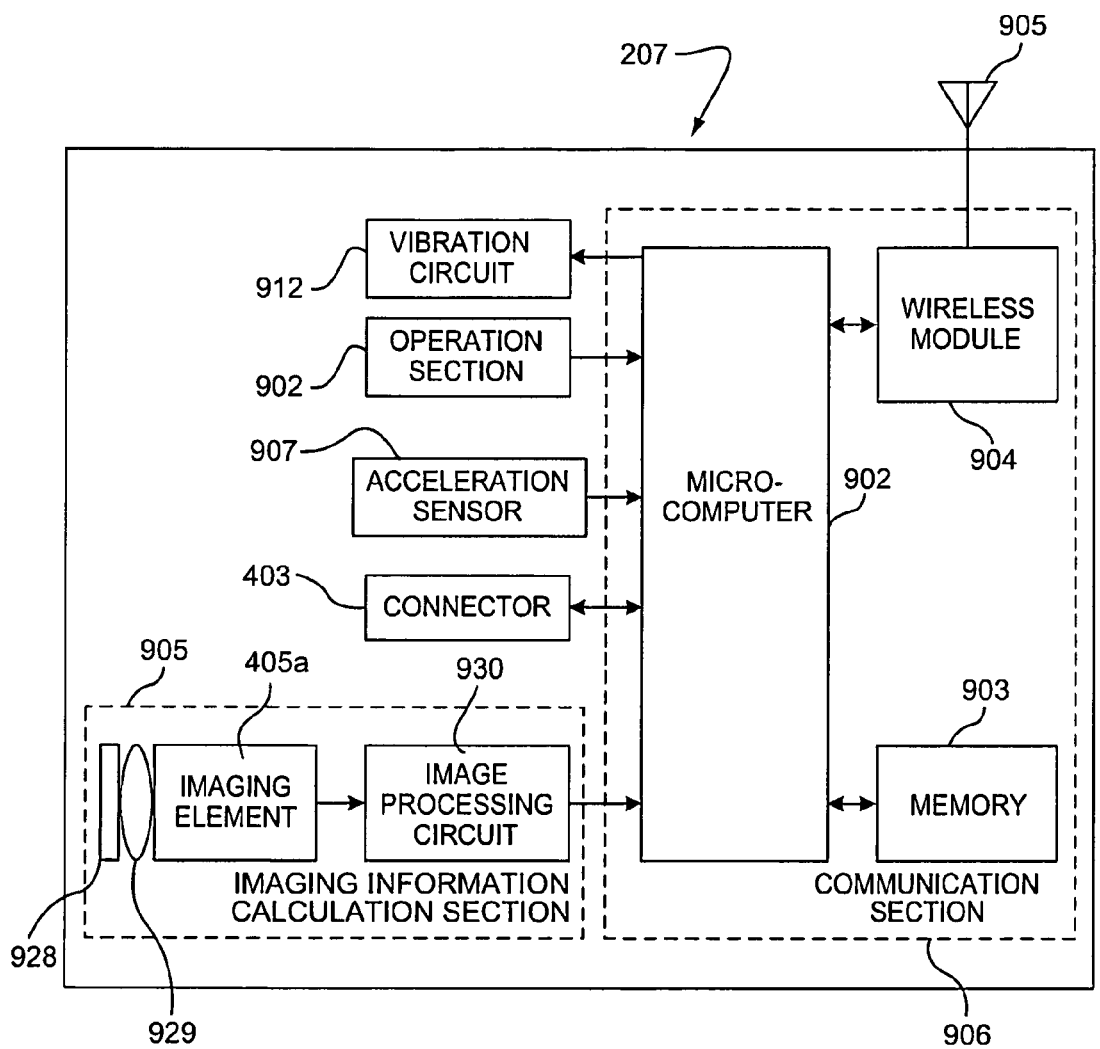

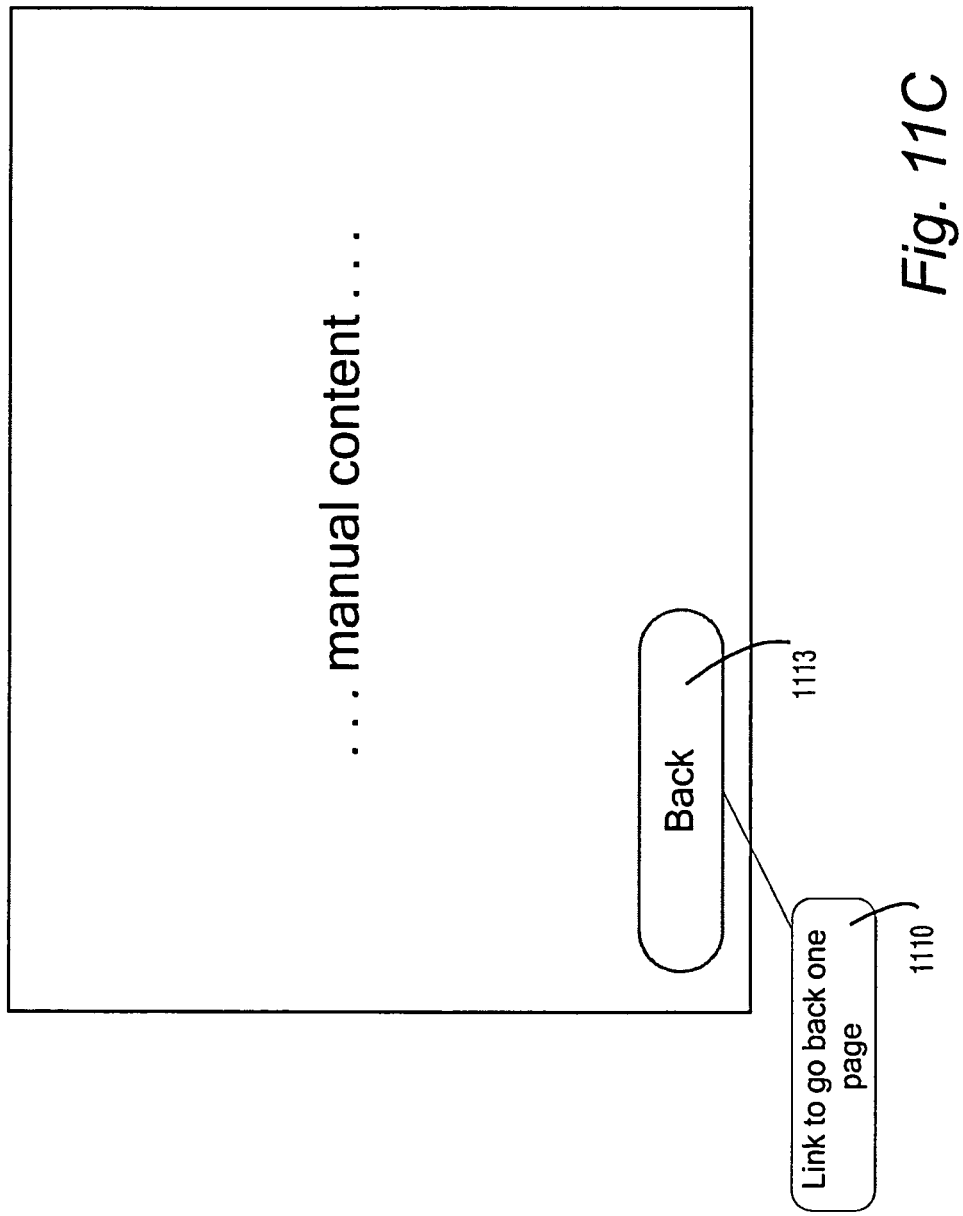

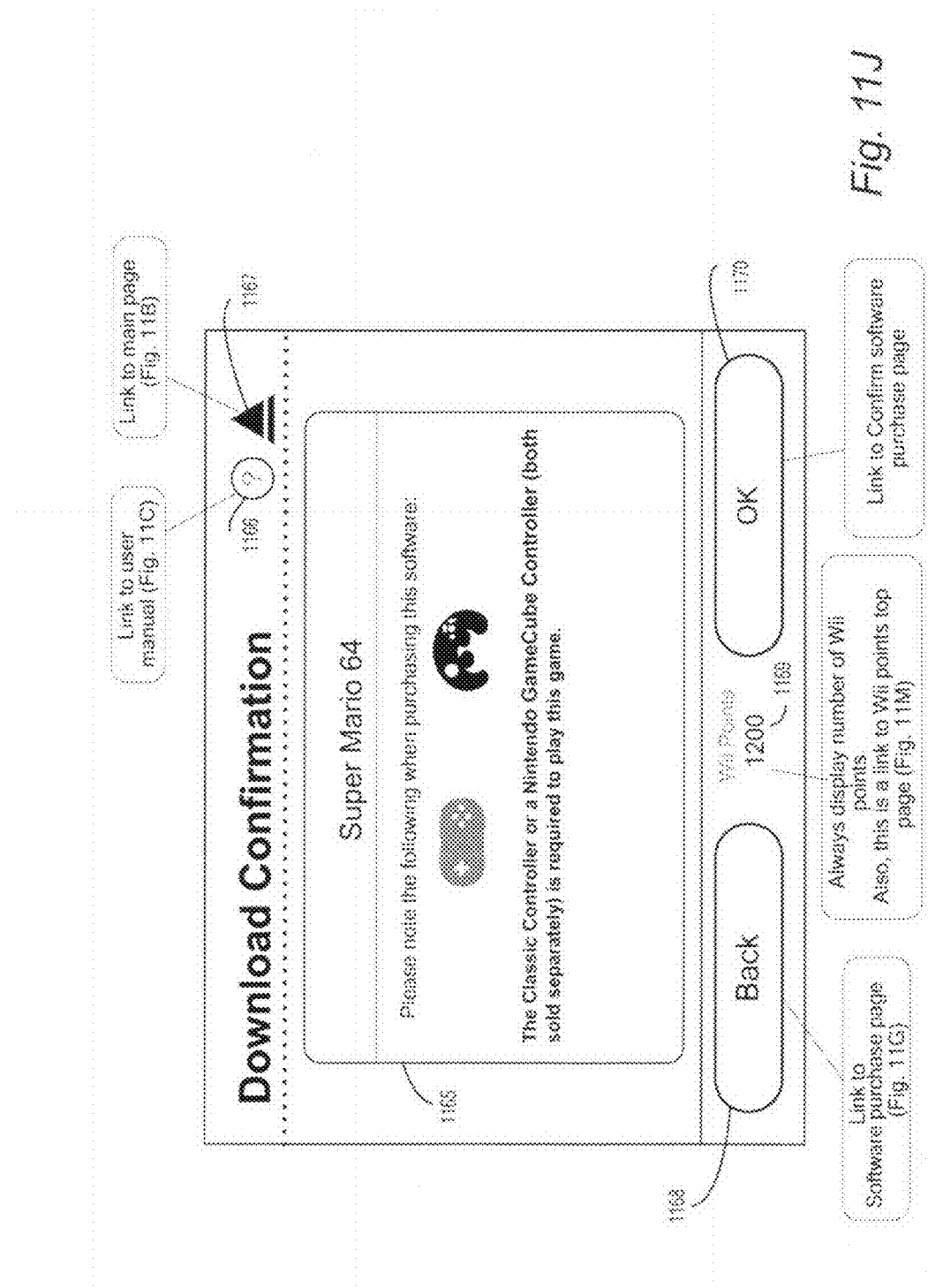

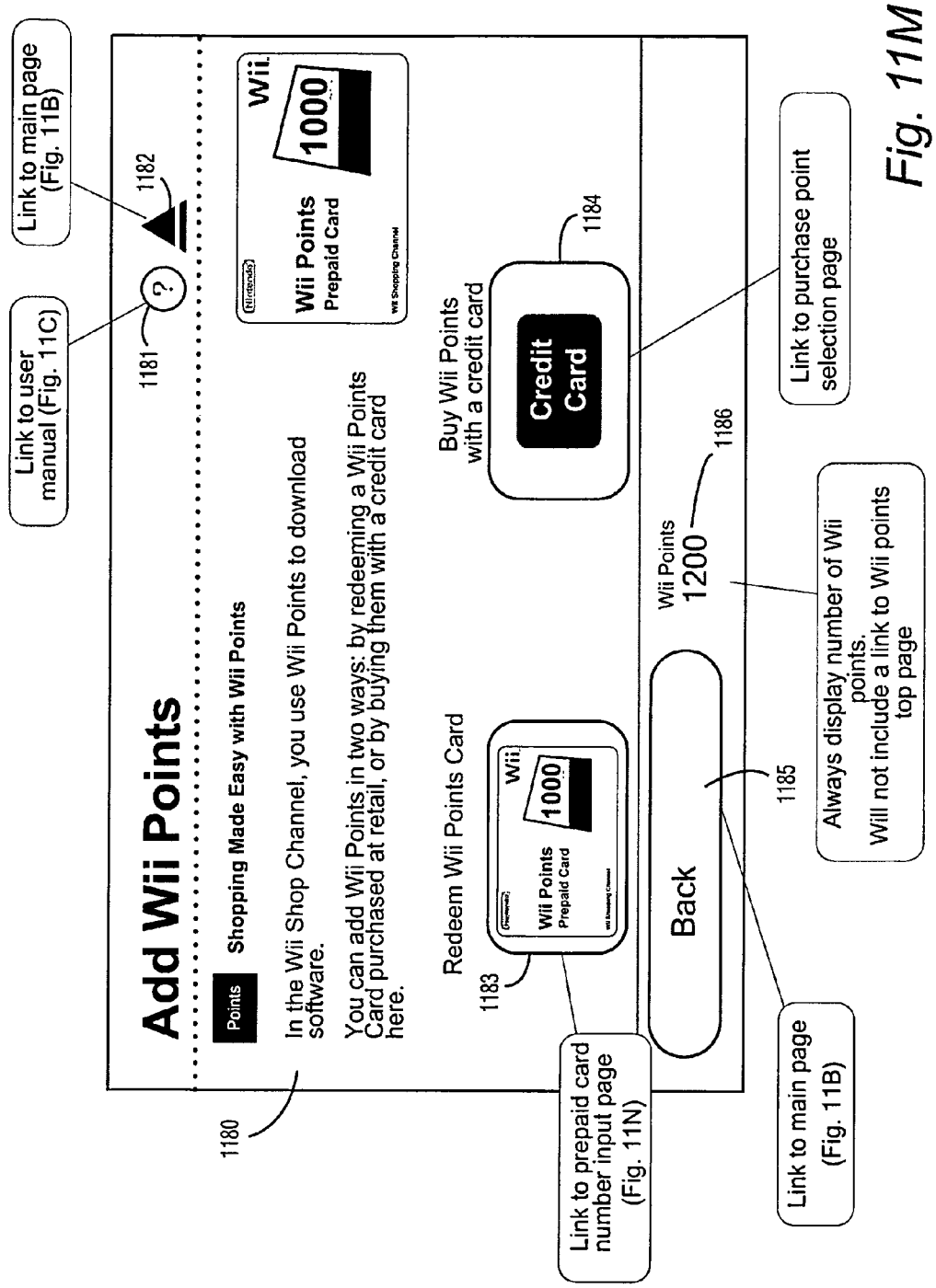

SYSTEM AND METHOD FOR DOWNLOADING VIDEO GAME PROGRAMS

COPYRIGHTS PRESERVED

A portion of the disclosure of this patent document contains material which is subject to copyright protection. The copyright owner has no objection to the facsimile reproduction by anyone of the patent document or the patent disclosure as it appears in the United States Patent and Trademark Office patent file or records, but otherwise reserves all copyright rights whatsoever.

TECHNICAL FIELD

This patent application relates to systems and methods for downloading video game programs, for example, from a server to a video game system such as a video game console or a hand-held video game machine.

BACKGROUND AND SUMMARY

The ever-increasing power of CPUs and graphics processors has permitted development of interactive graphics systems that rapidly generate complex images. Video game consoles use this power so that players can, for example, control video game characters in game worlds rich in real-world images and sounds. Video game consoles can now be developed with outputs to high-definition televisions and associated speaker arrays to provide remarkably realistic gaming experiences.

It has generally been the case that more complicated player inputs are required to interact with the game worlds created by such high-powered video game consoles. Thus rapid inputs to a wide variety of input devices such as buttons, joysticks, cross-switches and the like are required to navigate in these game worlds. While certain game players will have an appropriate combination of time, patience and skill to play video games on these high-powered consoles, other game players are likely to find the experience frustrating.

Moreover, new video game consoles are often not configured to execute game programs developed for other platforms. These other platforms may include earlier generations of consoles from a particular manufacturer or current- and earlier-generation consoles from other manufacturers. Players are thereby inconvenienced by needing multiple consoles to play video games for multiple platforms and by connecting and disconnecting these consoles from their televisions depending on the game being played.

This patent application describes example systems and methods that, among other things, provide a fun and intuitive input device for playing games. Moreover, other example systems and methods permit players to play games developed for other consoles such as earlier generation consoles.

BRIEF DESCRIPTION OF THE DRAWINGS

FIG. 3 is a non-limiting example block diagram of the video game console 200 shown in FIG. 2;

FIG. 9 is a block diagram showing example components of controller 207;

DETAILED DESCRIPTION OF NON-LIMITING EXAMPLE EMBODIMENTS

Figure 1:
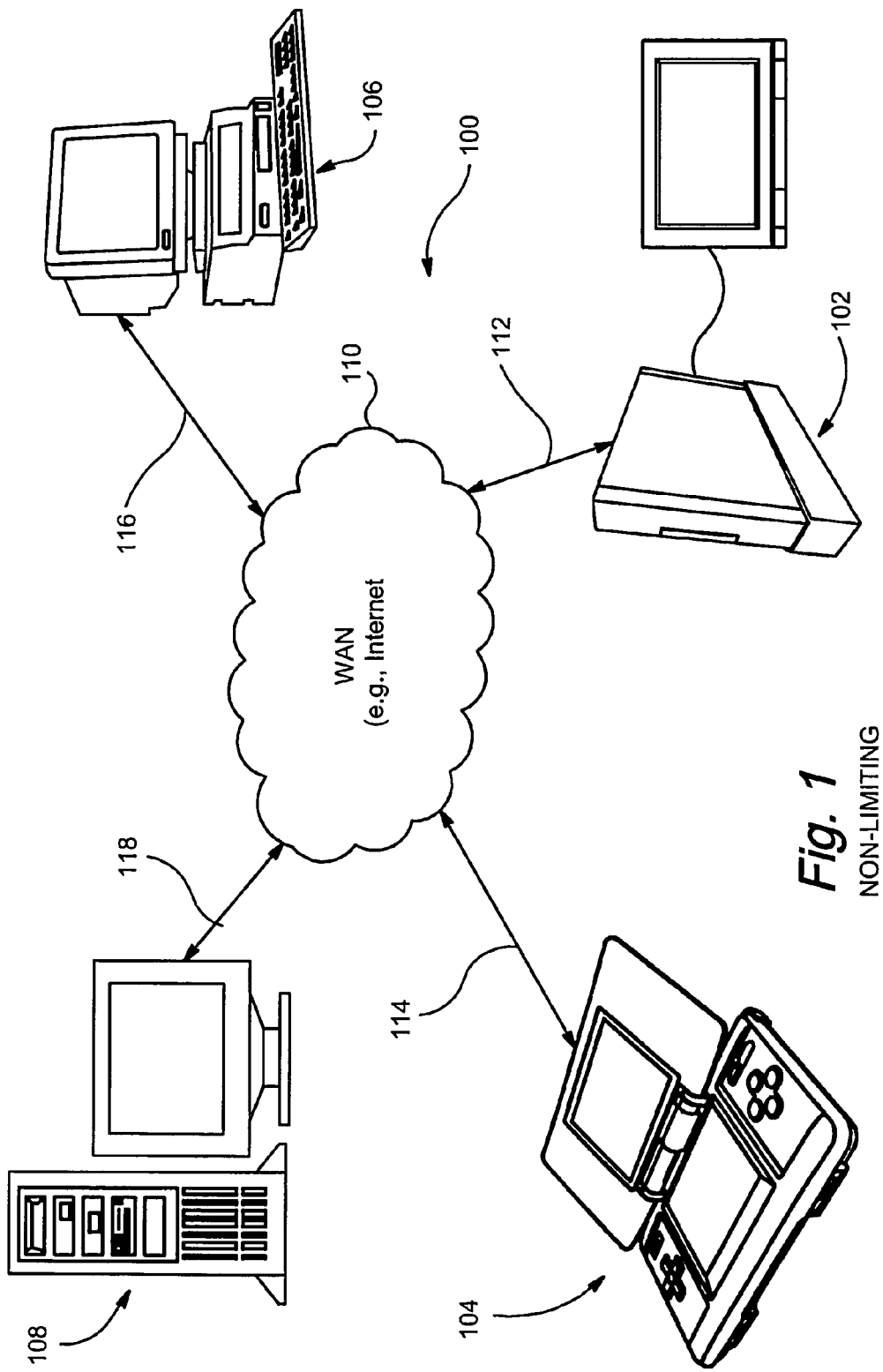
FIG. 1 is a block diagram of a non-limiting example video game program download system.

FIG. 1 is a block diagram of a non-limiting example video game program download system 100 in which video game programs are downloaded over a wide area network (WAN) 110 such as the internet from a server 108 to one or more of a video game system 102, a video game system 104 and a personal computer 106. Video game system 102, video game system 104, personal computer 106 and server 108 are connected to wide area network 110 via respective links 112, 114, 116 and 118. These links may, for example, be dial-up or network links (e.g., via a cable modem) to an internet service provider (ISP), links to wireless access points and the like.

By way of example without limitation, video game system 102 is a Wii™ video game console and video game system 104 is a DS™ hand-held video game machine, both from Nintendo®. By way of further example without limitation, personal computer 106 is a conventional PC optionally configured with high-performance CPU(s) and graphics and audio processors for enhanced video game capabilities. While FIG. 1 shows one video game system 102, one video game system 104 and one personal computer 106, it will be readily apparent that multiple systems of each type may be present in system 100. Moreover, many different types of hand-held and console video game systems and personal computers may be used system 100. It is also possible to provide separate servers for each type of video game system. For example, all video game consoles of a particular type (e.g., all Wii video game consoles) may be connected to a first server and all hand-held systems of a particular type (e.g., all DS hand-held video game machines) may be connected to a second different server.

The discussion below makes specific reference to downloading video game programs to video game system 102, which in this example is a video game console. However, it will be appreciated that the systems and methods described herein are readily applicable to downloading video game programs to hand-held video game machines and/or to personal computers running video game programs.

Server 108 stores (or has access to) video game programs for one or more different video game platforms. By way of example without limitation, server 108 may store video game programs for the Nintendo Entertainment System (NES), Super Nintendo Entertainment System (SNES) and Nintendo 64 (N-64) game systems. These video game programs may be selectively downloaded to video game system 102, video game system 104 and/or personal computer 106 in response to requests generated by inputs thereto. For example, video game system 102 may contact server 108 over the wide area network 110 to receive display data for generating a menu of video game programs for display on an associated display device (e.g., a television). A user may make a selection from this menu using an input device (e.g., game controller). In response, the selected video game program is downloaded over wide area network 110 to video game system 102 where the video game program is stored in memory (e.g., on-board flash memory).

In one example embodiment, server 108 may in fact be made up of multiple servers. By way of example without limitation, server 108 may include a video game program server for storing video game programs and responding to requests from video game systems for downloading selecting ones of the video game programs thereto. Server 108 may also include an account management server for managing the accounts of the users of the download system. These different servers may run on the same computer system or each server may run on one or more different interconnected computer systems.

The game programs stored on server 108 are generally not directly executable by the game program executing system of, for example, video game system 102. Consequently, server 108 stores (or has access to) programs that provide compatibility between the video game programs and game system 102. Emulators are an example of programs that provide such compatibility. A particular emulator may be associated with one or more or all video games for a particular platform. For example, one emulator may be game-specific, i.e., developed so that a specific game can be executed on a particular target platform. Other emulators may be used to execute multiple games on a particular target platform. Still other emulators may be used to execute all games on a particular target platform.

Server 108 "bundles" an emulator with a selected game so that the selected game can be executed by the video game executing system of the target game system, in this case video game system 102. Thus, the selection by a player of a video game program for downloading results in both that video game program and an emulator being downloaded to game system 102. The user need not make any separate selection of an emulator. The video game program executing system of game system 102 executes the emulator program so that the game corresponding to the selected video game program can be played on game system 102. The downloading and execution of the emulator program can be hidden from the user. That is, the selection of the video game program causes the game server to bundle the emulator with the selected video game program and a selection to play a game causes execution of the emulator.

Figure 2:
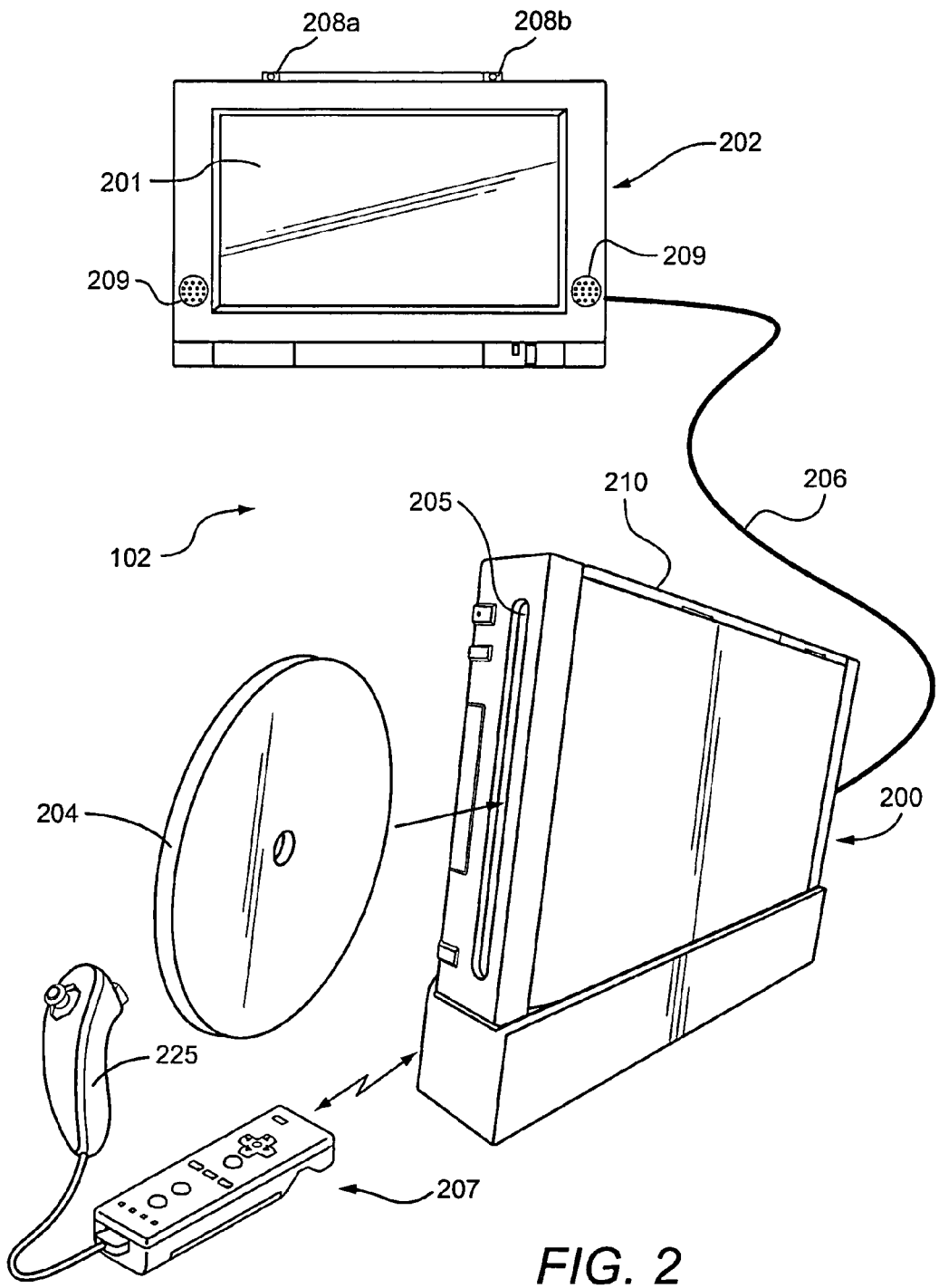
FIG. 2 shows a non-limiting example video game system 102.

FIG. 2 shows a non-limiting example video game system 102 including a video game console 200, a television 202 and a controller 207.

Video game console 200 is a "target platform" for the downloaded video game programs and has a higher performance CPU and graphics processor than, for example, the "native platforms" for which video game programs downloaded from server 108 were developed (e.g., the Nintendo Entertainment System (NES), Super Nintendo Entertainment System (SNES) and Nintendo 64 (N-64) game systems). The download systems and methods described herein permit video games developed for these lower performance native platforms to be played on a high performance target platform. This provides significant versatility for the target platform since the target platform is able to execute video game programs developed for its high performance CPU and graphics processor as well as video game programs developed for earlier generation (e.g., less powerful) platforms. The emulators, which as noted above may be game-specific, allow the target platform to substantially recreate the gaming experience provided by the earlier generation platforms. As will be described below, the controller for video game console 200 has a connector to which controllers similar or even identical to the controllers for the earlier generation platforms can be connected, further enhancing the recreation of the gaming experience provided by the native platform.

Video game console 200 executes a game program or other application stored on optical disc 204 inserted into slot 205 formed in housing 210 thereof. The result of the execution of the game program or other application is displayed on display 201 of television 202 to which video game console 200 is connected by cable 206. Audio associated with the game program or other application is output via speakers 209 of television 202. While an optical disk is shown in FIG. 2, the game program or other application may alternatively or additionally be stored on other storage media such as semiconductor memories, magneto-optical memories, magnetic memories and the like.

Controller 207 wirelessly transmits data such as game control data to video game console 200. The game control data may be generated using an operation section of controller 207 having, for example, a plurality of operation buttons, a key, a stick and the like. Controller 207 may also wirelessly receive data transmitted from video game console 200. By way of example without limitation, this data may include sound data for output via a speaker (not shown) of controller 207 or vibration control data for controlling a vibration circuit (not shown) of controller 207. Any one of various wireless protocols such as Bluetooth (registered trademark) may be used for the wireless transmissions between controller 207 and video game console 200.

A "nunchuk" controller 225 may be connected to controller 207. Although a wired connection is shown in FIG. 2 between controller 207 and nunchuk controller 225, a wireless connection may alternatively be used. Nunchuk controller 225 may be held in the user's "other" hand (i.e., the hand not holding controller 207) and provides additional game control data to video game console 200.

Controller 207 also includes an imaging information calculation section for capturing and processing images from light-emitting devices 208a and 208b. Although markers 208a and 208b are shown in FIG. 2 as being above television screen 201, they may also be positioned below television screen 201. In one implementation, a center point between light-emitting devices 208a and 208b is substantially aligned with a vertical center-line of television screen 201. The images from light-emitting devices 208a and 208b can be used to determine a direction in which controller 207 is pointing as well as a distance of controller 207 from television screen 201. By way of example without limitation, light-emitting devices 208a and 208b may be implemented as two LED modules (hereinafter, referred to as "markers") provided in the vicinity of screen 201 of television 202. The markers each output infrared light and the imaging information calculation section of controller 207 detects the light output from the LED modules to determine a direction in which controller 207 is pointing and a distance of controller 207 from display screen 201 as mentioned above.

With reference to the block diagram of FIG. 3, video game console 200 includes a RISC central processing unit (CPU) 304 for executing various types of applications including (but not limited to) video game programs. CPU 304 executes a boot program stored in a boot ROM (not shown) to initialize video game console 200 and then executes an application (or applications) stored on optical disc 204, which is inserted in optical disk drive 308. User-accessible eject button 310 provided on housing 210 of video game console 200 may be used to eject an optical disk from disk drive 308.

In one example implementation, optical disk drive 308 receives both optical disks of a first type (e.g., of a first size and/or of a first data structure, etc.) containing applications developed to take advantage of the capabilities of CPU 304 and graphics processor (GPU) 316 and optical disks of a second type (e.g., of a second size and/or a second data structure) containing applications originally developed for execution by a CPU and/or graphics processor having capabilities different than those of CPU 304 and/or graphics processor 316. For example, the optical disks of the second type may be applications originally developed for the Nintendo GameCube platform.

CPU 304 is connected to system LSI 302 that includes graphics processing unit 316 with an associated graphics memory 320, audio digital signal processor (DSP) 318, internal main memory 322 and input/output (IO) processor 324.

IO processor 324 of system LSI 302 is connected to one or more USB ports 326, one or more standard memory card slots (connectors) 328, WiFi module 330, flash memory 332 and wireless controller module 340.

USB ports 326 are used to connect a wide variety of external devices to video game console 200. These devices include by way of example without limitation game controllers, keyboards, storage devices such as external hard-disk drives and memory sticks, printers, digital still and video cameras and the like. USB ports 326 may also be used for wired and wireless network (e.g., LAN) connections. In one example implementation, two USB ports 326 are provided.

Standard memory card slots (connectors) 328 are adapted to receive industry-standard-type memory cards (e.g., SD memory cards). In one example implementation, one memory card slot 328 is provided. These memory cards are generally used as data carriers but of course this use is provided by way of illustration, not limitation. For example, a player may store game data for a particular game on a memory card and bring the memory card to a friend's house for use when the game is played on the friend's video game console. The memory cards may also be used to transfer data between the game console and personal computers, digital cameras, and the like. In the example download system described herein, downloaded video game programs may also be stored on memory cards connected to video game console 200 via connectors 328.

WiFi module 330 enables video game console 200 to be connected to a wireless access point. The access point may provide internet connectivity for on-line gaming with players at other locations (with or without voice chat capabilities), as well as web browsing, e-mail, file downloads (including video game program downloads) and many other types of on-line activities. In some implementations, WiFi module may also be used for communication with other game devices such as suitably-equipped hand-held game machines (e.g., the DS hand-held game machine). Module 330 is referred to herein as "WiFi", which is generally a designation used in connection with the family of IEEE 802.11 specifications. However, video game console 200 may alternatively or additionally use wireless modules that conform to other wireless standards.

Flash memory 332 stores, by way of example without limitation, game save data, system files, internal applications for the console and downloaded data (such as video game programs).

Wireless controller module 340 receives signals wirelessly transmitted from one or more controllers 207 and provides these received signals to IO processor 324. The signals transmitted by controller 207 to wireless controller module 340 may include signals generated by controller 207 itself as well as signals generated by other devices such as nunchuk controller 225 that may be connected to controller 207.

Wireless controller module 340 may also wirelessly transmit signals to controller 207. By way of example without limitation, controller 207 (and/or another game controller connected thereto) may be provided with vibration circuitry and vibration circuitry control signals may be sent via wireless controller module 340 to control the vibration circuitry (e.g., by turning the vibration circuitry on and off). By way of further example without limitation, controller 207 may be provided with (or be connected to) a speaker (not shown) and audio signals for output from this speaker may be wirelessly communicated to controller 207 via wireless controller module 340. By way of still further example without limitation, controller 207 may be provided with (or be connected to) a display device (not shown) and display signals for output from this display device may be wirelessly communicated to controller 207 via wireless controller module 340.

Proprietary memory card slots 346 are adapted to receive proprietary memory cards. In one example implementation, two such slots are provided. These proprietary memory cards have some non-standard feature(s) such as a non-standard connector and/or non-standard memory architecture. For example, one or more of the memory card slots 346 may be adapted to receive memory cards used with the Nintendo GameCube platform. In this case, memory cards inserted in such slots can transfer data from games developed for the GameCube platform. In an example implementation, memory card slots 346 may be used for read-only access to the memory cards inserted therein and limitations may be placed on whether data on these memory cards can be copied or transferred to other storage media such as standard memory cards inserted into slots 328.

One or more controller connectors 344 are adapted for wired connection to respective game controllers. In one example implementation, four such connectors are provided for wired connection to game controllers for the Nintendo GameCube platform. Alternatively, connectors 344 may be connected to respective wireless receivers that receive signals from wireless game controllers. These connectors enable players, among other things, to use controllers for the Nintendo GameCube platform when an optical disk for a game developed for this platform is inserted into optical disk drive 308.

A connector 348 is provided for connecting game console 200 to DC power derived, for example, from an ordinary wall outlet. Of course, the power may be derived from one or more batteries.

GPU 316 performs image processing based on instructions from CPU 304. GPU 316 includes, for example, circuitry for performing calculations necessary for displaying three-dimensional (3D) graphics. GPU 316 performs image processing using graphics memory 320 dedicated for image processing and a part of internal main memory 322. GPU 316 generates image data for output to television 202 by audio/video connector 314 via audio/video IC (interface) 312.

Audio DSP 318 performs audio processing based on instructions from CPU 304. The audio generated by audio DSP 318 is output to television 202 by audio/video connector 314 via audio/video IC 312.

External main memory 306 and internal main memory 322 are storage areas directly accessible by CPU 304. For example, these memories can store an application program such as a game program read from optical disc 204 by CPU 304, a downloaded video game program (and corresponding emulator) read from flash memory 332 by CPU 304, various types of data or the like.

ROM/RTC 338 includes a real-time clock and preferably runs off of an internal battery (not shown) so as to be usable even if no external power is supplied. ROM/RTC 338 also may include a boot ROM and SRAM usable by the console.

Power button 342 is used to power video game console 200 on and off. In one example implementation, power button 342 must be depressed for a specified time (e.g., one or two seconds) to turn the video game console off so as to reduce the possibility of inadvertently turn-off. Reset button 344 is used to reset (re-boot) video game console 200.

Figure 4A:
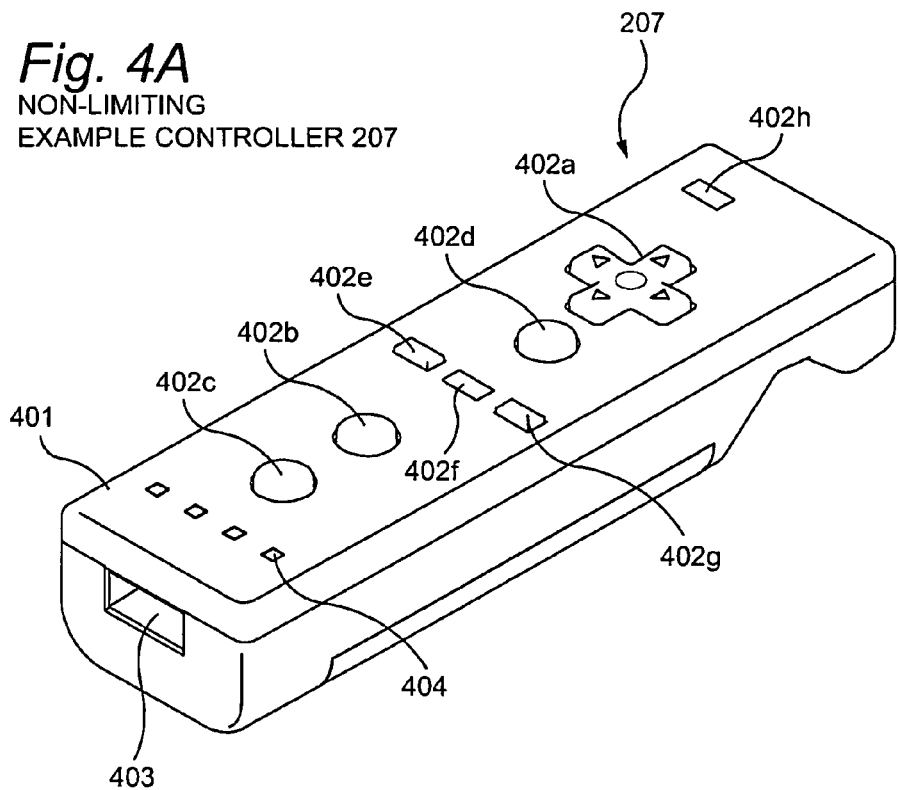
FIGS. 4A-4C show a non-limiting example controller 207.
Figure 4B:
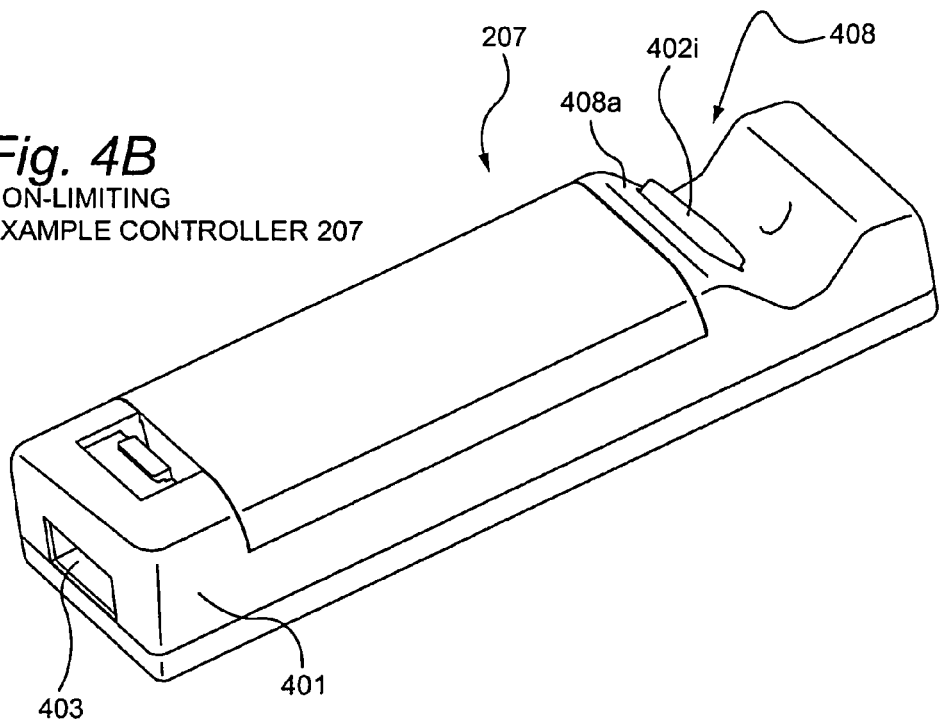
Figure 4C:
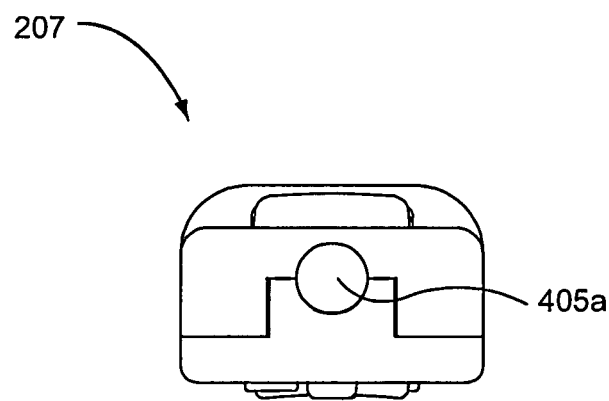

With reference to FIGS. 4A-4C, example controller 207 includes a housing 401 on which operating controls 402a-402i are provided. Housing 401 has a generally parallelepiped shape and is sized to be conveniently grasped by a player's hand. Cross-switch 402a is provided at the center of a forward part of a top surface of the housing 401. Cross-switch 402a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 402a. By actuating cross-switch 402a, the player can, for example, move a character in different directions in a virtual game world.

Cross-switch 402a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 401 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player can be used.

Buttons (or keys) 402b through 402g are provided rearward of cross-switch 402a on the top surface of housing 401. Buttons 402b through 402g are operation devices that output respective signals when a player presses them. For example, buttons 402b, 402c and 402d are respectively an "X" button, a "Y" button and a "B" button and buttons 402e, 402f and 402g are respectively a select switch, a menu switch and a start switch, for example. Generally, buttons 402b through 402g are assigned various functions in accordance with the application being executed by video game console 200. In an exemplary arrangement shown in FIGS. 4A-4C, buttons 402b, 402c and 402d are linearly arranged along a front-to-back centerline of the top surface of housing 401. Buttons 402e, 402f and 402g are linearly arranged along a left-to-right line between buttons 402b and 402d. Button 402f may be recessed from a top surface of housing 401 to reduce the possibility of inadvertent pressing by a player grasping controller 207.

Button 402h is provided forward of cross-switch 402a on the top surface of the housing 401. Button 402h is a power switch for remote on-off switching of the power to game console 200. Button 402h may also be recessed from a top surface of housing 401 to reduce the possibility of inadvertent pressing by a player.

Multiple (e.g., four) LEDs 404 are provided rearward of button 402c on the top surface of housing 401. Controller 207 is assigned a controller type (number) so as to be distinguishable from other controllers used with video game console 200 and LEDs 404 may be used to provide a player a visual indication of this assigned controller number. For example, when controller 207 transmits signals to wireless controller module 340, one of the multiple LEDs corresponding to the controller type is lit up.

With reference to FIG. 4B, a recessed portion 408 is formed on a bottom surface of housing 401. Recessed portion 408 is positioned so as to receive an index finger or middle finger of a player holding controller 207. A button 402i is provided on a rear, sloped surface 408a of the recessed portion. Button 402i functions, for example, as an "A" button which can be used, by way of illustration, as a trigger switch in a shooting game.

As shown in FIG. 4C, an imaging element 405a is provided on a front surface of controller housing 401. Imaging element 405a is part of an imaging information calculation section of controller 207 that analyzes image data received from markers 208a and 208b. The imaging information calculation section has a maximum sampling period of, for example, about 200 frames/sec., and therefore can trace and analyze even relatively fast motion of controller 207. Additional details may be found in application Ser. No. 11/532,328, filed on Sep. 15, 2006, which claims the benefit of Application No. 60/716,937, entitled "VIDEO GAME SYSTEM WITH WIRELESS MODULAR HANDHELD CONTROLLER," filed on Sep. 15, 2005; application Ser. No. 11/445,280, filed Jun. 2, 2006, which claims the benefit of Application No. 60/732,648, entitled "INFORMATION PROCESSING PROGRAM," filed on Nov. 3, 2005; and application Ser. No. 11/441,146, filed May 26, 2006 which claims the benefit of Application No. 60/732,649, entitled "INFORMATION PROCESSING SYSTEM AND PROGRAM THEREFOR," filed on Nov. 3, 2005. The entire contents of each of these applications are expressly incorporated herein.

Connector 403 is provided on a rear surface of controller housing 401. Connector 403 is used to connect devices to controller 207. For example, a second controller of similar or different configuration may be connected to controller 207 via connector 403 in order to allow a player to play video games using game control inputs from both hands. Other devices including game controllers for other game consoles, input devices such as keyboards, keypads and touchpads and output devices such as speakers and displays may be connected to controller 207 using connector 403.

One example device for connection to controller 207 via connector 403 is nunchuk controller 225 shown in FIG. 2. Nunchuk controller 225 includes, for example, an analog joystick and a trigger switch. If controller 207 is held in a user's right/left hand, nunchuk controller 225 is held in the user's left/right hand and may be used to provide additional user inputs to console video game console 200. By way of example without limitation, controller 207 may be used to control a sword during gameplay and nunchuk controller 225 may be used to control a shield during the gameplay.

As shown in the block diagram of FIG. 9, controller 207 includes a three-axis, linear acceleration sensor 907 that detects linear acceleration in three directions, i.e., the up/down direction (e.g., Z-axis direction), the left/right direction (e.g., X-axis direction), and the forward/backward direction (e.g., Y-axis direction). Alternatively, a two-axis linear accelerometer or a one-axis linear accelerometer may be used. Generally speaking, the accelerometer arrangement (e.g., three-axis or two-axis or one-axis) will depend on the type of control signals desired. As a non-limiting example, the three-axis or two-axis linear accelerometer may be of the type available from Analog Devices, Inc. or STMicroelectronics N.V. Preferably, acceleration sensor 907 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 907.

As one skilled in the art understands, linear accelerometers, as used in acceleration sensor 907, are only capable of detecting acceleration along a straight line corresponding to each axis of the acceleration sensor. In other words, the direct output of acceleration sensor 907 is limited to signals indicative of linear acceleration (static or dynamic) along each of the two or three axes thereof. As a result, acceleration sensor 907 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 907, additional information relating to controller 207 can be inferred or calculated (i.e., determined), as one skilled in the art will readily understand from the description herein. For example, by detecting static, linear acceleration (i.e., gravity), the linear acceleration output of acceleration sensor 907 can be used to determine tilt of the object relative to the gravity vector by correlating tilt angles with detected linear acceleration. In this way, acceleration sensor 907 can be used in combination with micro-computer 902 of controller 207 (or another processor) to determine tilt, attitude or position of controller 207. Similarly, various movements and/or positions of controller 207 can be calculated through processing of the linear acceleration signals generated by acceleration sensor 907 when controller 207 containing acceleration sensor 907 is subjected to dynamic accelerations by, for example, the hand of a user.

In another embodiment, acceleration sensor 907 may include an embedded signal processor or other type of dedicated processor for performing any desired processing of the acceleration signals output from the accelerometers therein prior to outputting signals to micro-computer 902. For example, the embedded or dedicated processor could convert the detected acceleration signal to a corresponding tilt angle (or other desired parameter) when the acceleration sensor is intended to detect static acceleration (i.e., gravity).

Returning to FIG. 9, imaging information calculation section 905 of controller 207 includes infrared filter 928, lens 929, imaging element 905a and image processing circuit 930. Infrared filter 928 allows only infrared light to pass therethrough from the light that is incident on the front surface of controller 207. Lens 929 collects and focuses the infrared light from infrared filter 928 on imaging element 905a. Imaging element 905a is a solid-state imaging device such as, for example, a CMOS sensor or a CCD. Imaging element 905a captures images of the infrared light from markers 208a and 208b collected by lens 929. Accordingly, imaging element 905a captures images of only the infrared light that has passed through infrared filter 928 and generates image data based thereon. This image data is processed by image processing circuit 920 which detects an area thereof having high brightness, and, based on this detecting, outputs processing result data representing the detected coordinate position and size of the area to communication section 906. From this information, the direction in which controller 207 is pointing and the distance of controller 207 from display screen 201 can be determined.

Vibration circuit 912 may also be included in controller 207. Vibration circuit 912 may be, for example, a vibration motor or a solenoid. Controller 207 is vibrated by actuation of the vibration circuit 912 (e.g., in response to signals from video game console 200), and the vibration is conveyed to the hand of the player grasping controller 207. Thus, a so-called vibration-responsive game may be realized.

As described above, acceleration sensor 907 detects and outputs the acceleration in the form of components of three axial directions of controller 207, i.e., the components of the up-down direction (e.g., Z-axis direction), the left-right direction (e.g., X-axis direction), and the front-rear direction (e.g., Y-axis direction) of controller 207. Data representing the acceleration as the components of the three axial directions detected by acceleration sensor 907 is output to communication section 906. Based on the acceleration data which is output from acceleration sensor 907, a motion of controller 207 can be determined.

Communication section 906 includes micro-computer 902, memory 903, wireless module 904 and antenna 905. Micro-computer 902 controls wireless module 904 for transmitting and receiving data while using memory 903 as a storage area during processing. Micro-computer 902 is supplied with data including operation signals (e.g., cross-switch, button or key data) from operation section 902, acceleration signals in the three axial directions (X-axis, Y-axis and Z-axis direction acceleration data) from acceleration sensor 907, and processing result data from imaging information calculation section 905. Micro-computer 902 temporarily stores the data supplied thereto in memory 903 as transmission data for transmission to video game console 200. The wireless transmission from communication section 906 to video game console 200 is performed at predetermined time intervals. Because game processing is generally performed at a cycle of 1/60 sec. (16.7 ms), the wireless transmission is preferably performed at a cycle of a shorter time period. For example, a communication section structured using Bluetooth (registered trademark) technology can have a cycle of 5 ms. At the transmission time, micro-computer 902 outputs the transmission data stored in memory 903 as a series of operation information to wireless module 904. Wireless module 904 uses, for example, Bluetooth (registered trademark) technology to send the operation information from antenna 905 as a carrier wave signal having a specified frequency. Thus, operation signal data from operation section 902, the X-axis, Y-axis and Z-axis direction acceleration data from acceleration sensor 907, and the processing result data from imaging information calculation section 905 are transmitted from controller 207. Video game console 200 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 304 of video game console 200 performs application processing. If communication section 906 is structured using Bluetooth (registered trademark) technology, controller 207 can also receive data wirelessly transmitted thereto from devices including video game console 200.

Figure 4D:
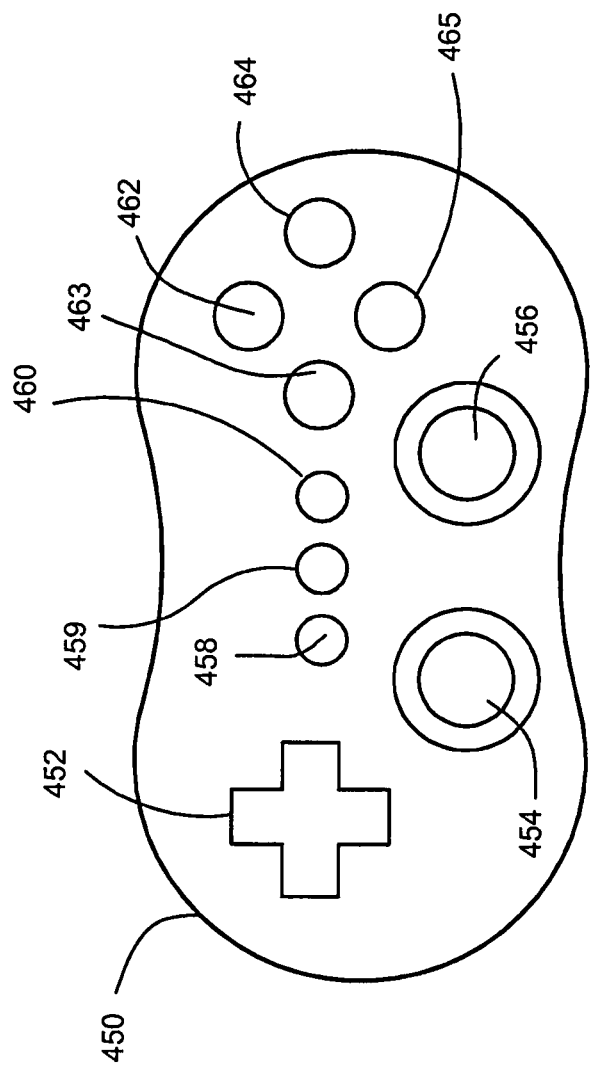
FIG. 4D shows a non-limiting example controller that is connectable to controller 207.

FIG. 4D shows an example of another type of controller that can be coupled to controller 207 via connector 403. Controller 450 may be used, for example, as a controller for downloaded games played on video game console 200 that were originally developed for other gaming platforms. Controller 450 includes a cross-switch 452 that may be actuated to move a video game characters and objects in different up, down left and right directions. Analog sticks 454 and 456 may be used to move video game characters and objects in any direction (i.e., 360 degrees). Buttons 458, 459 and 460 may be used, for example, to start, quit and pause game play. Buttons 462, 464, 466 and 468 may be used for perform character or object actions such as jumping, firing weapons, crawling, etc. Shoulder keys (not shown in FIG. 4D) may also be used to perform character or object actions. Inputs to controller 450 are sent to controller 207 via connector 403 and then to video game console 200 for processing.

Figure 5:
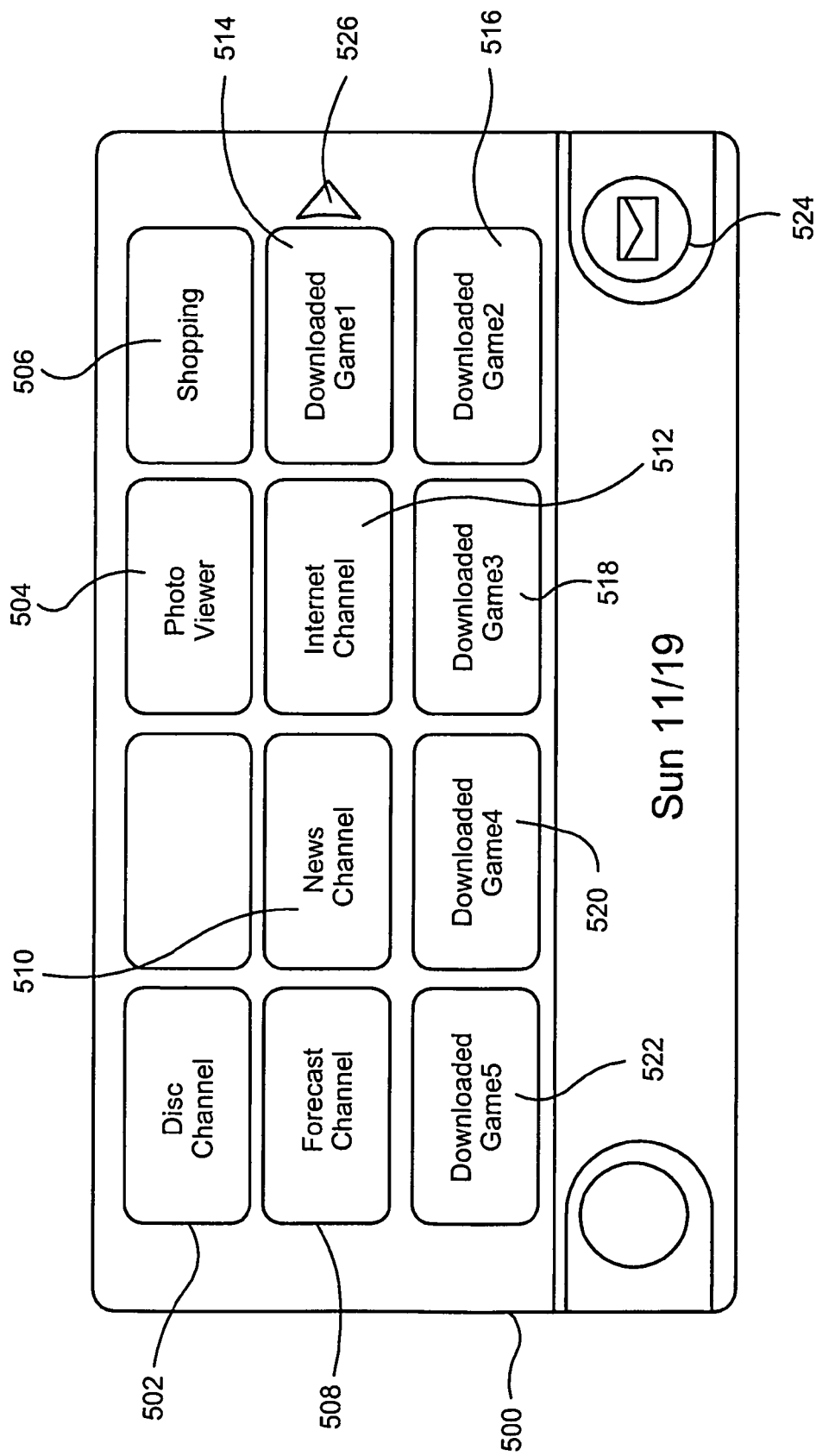
FIG. 5 shows a non-limiting example user-interface screen for downloading video games.

FIG. 5 shows by way of example without limitation a user interface for video game console 200. This user interface is a channel menu that is displayed on television screen 201 and allows users to select one of a plurality of different "channels" for accessing various features of the console. The channel selection may be made by positioning an on-screen cursor using the optical position detection feature of controller 207 and then pressing "trigger" button 402i. Of course, other techniques for making selections may be used and the systems and methods described herein are in no way limited in this respect.

Disc channel 502 allows users to play game discs inserted in optical disc drive 308. As noted above, the inserted disc may contain games or other applications developed for video game console 200 or for a different console (e.g., the Nintendo GameCube).

Photo viewer channel 504 allows users to retrieve digital pictures from a memory card inserted into standard memory card slot(s) 328 of video game console 200 and display them on television screen 201. Users also can manipulate the photos by, for example, zooming into details or creating mosaics, puzzles or slide shows. A song stored on the memory card may be played while, for example, a slide show is being presented.

Shopping channel 506 allows user to download video game content, including video game programs originally developed for other platforms (e.g., the aforementioned NES, SNES and N64 platforms). After users download games from shopping channel 506, each downloaded game appears in the channel menu of FIG. 5 as its own channel. To play the downloaded game, users simply select the game's channel. In FIG. 5, channels 514, 516, 518, 520 and 522 correspond to channels for downloaded games.

Forecast channel 508 allows users to access and display local weather forecasts (e.g., retrieved from the Internet) after turning on video game console 200. The weather information can be automatically updated by accessing the Internet.

News channel 510 allows users to access and display local, national and world news (e.g., retrieved from the Internet), which may be organized into a variety of topical categories. The news can be automatically updated by accessing the Internet.

Internet channel 512 allows the user to access the internet to, for example, access web sites.

Right arrow 526 may be selected to move a different page of the channel menu. A left arrow (not shown) is present and may be selected when there are pages to the left of the current page.

Figure 6:
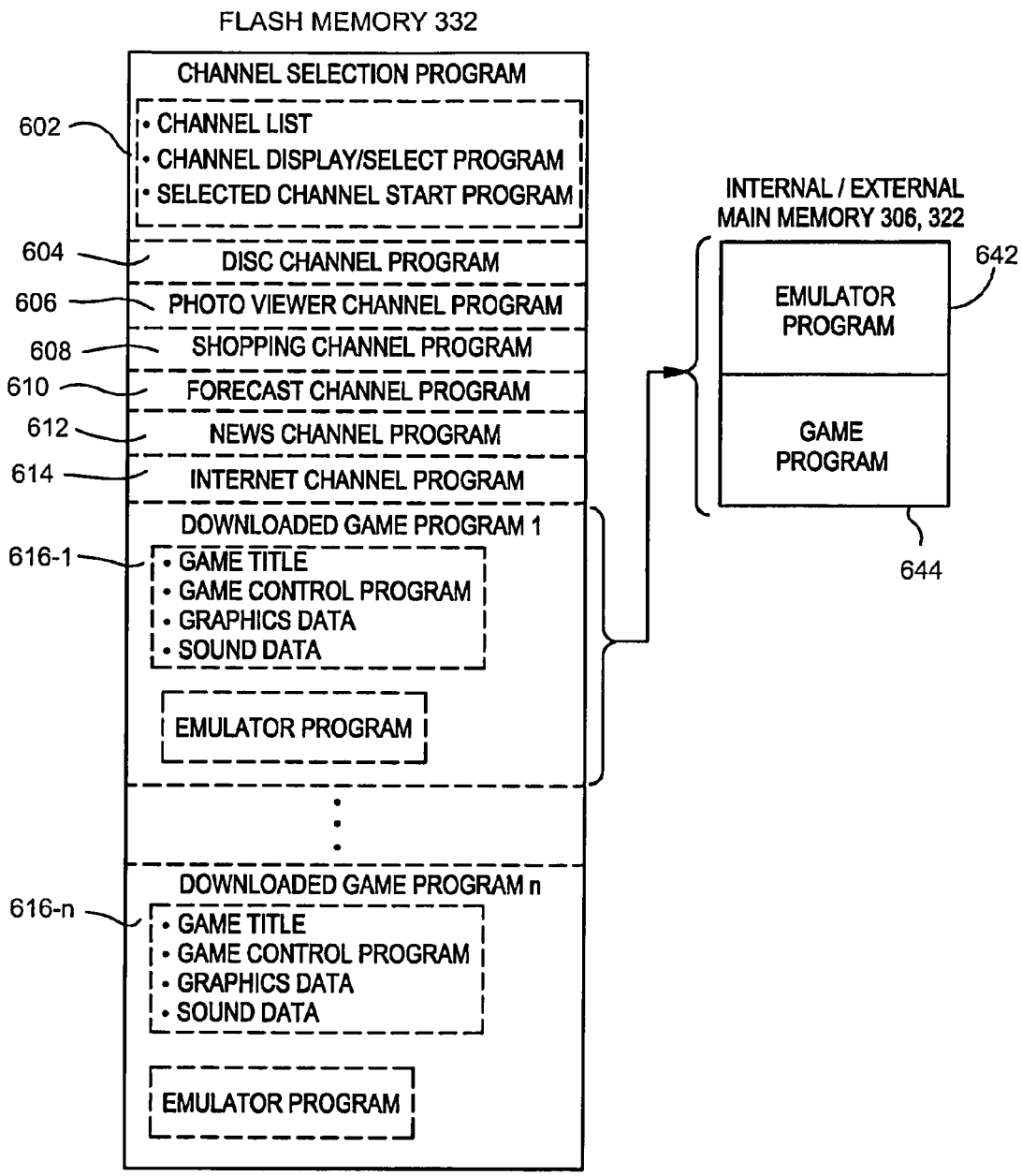
FIG. 6 shows non-limiting example contents of flash memory 332 and internal/external memories 306, 332.

FIG. 6 shows an example memory map for flash memory 332. The map of FIG. 6 is provided by way of example without limitation and the various programs may be readily organized in different manners and even using different and/or additional memories (e.g., memory cards inserted into standard memory card slot 338).

Flash memory 332 stores a channel selection program 602 for generating and displaying the channel menu and allowing users to make selections from the menu. Channel selection program 602 includes, by way of example without limitation, a channel list, a display/select program and a selected channel start program.

Programs for each of the channels are also contained in memory 332. Consequently, memory 332 includes disc channel program 604, photoviewer channel program 606, shopping channel program 608, forecast channel program 610, news channel program 612 and internet channel program 614. As noted above, after users download video game programs from shopping channel 506, each downloaded video game appears in the channel menu as its own channel. Thus, each of the downloaded games may be included in the channel list. Each downloaded video game program is stored in flash memory 332 along with a corresponding emulator program for providing compatibility between the native platform of the downloaded video game and the target platform (i.e., video game console 200). When a particular one of the video game program is selected from the channel menu, that video game program and the corresponding emulator are loaded into internal/external memory 306/322 for execution by CPU 304.

Figure 7C:
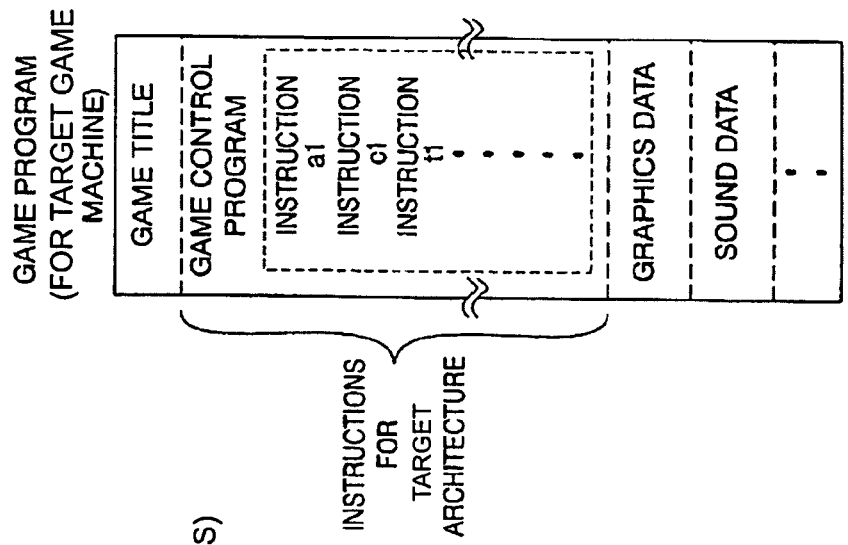
FIGS. 7A-7C are used to explain operation of an emulator.
Figure 7B:
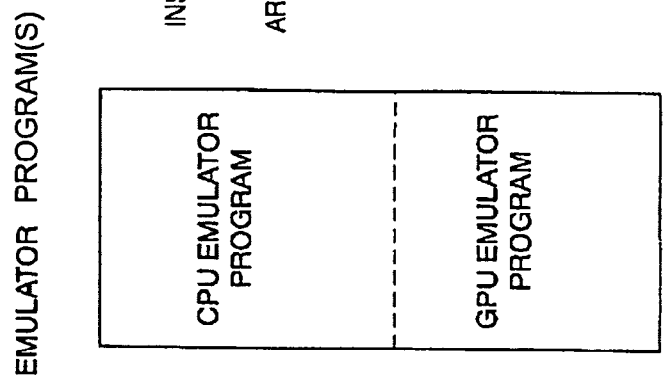
Figure 7A:
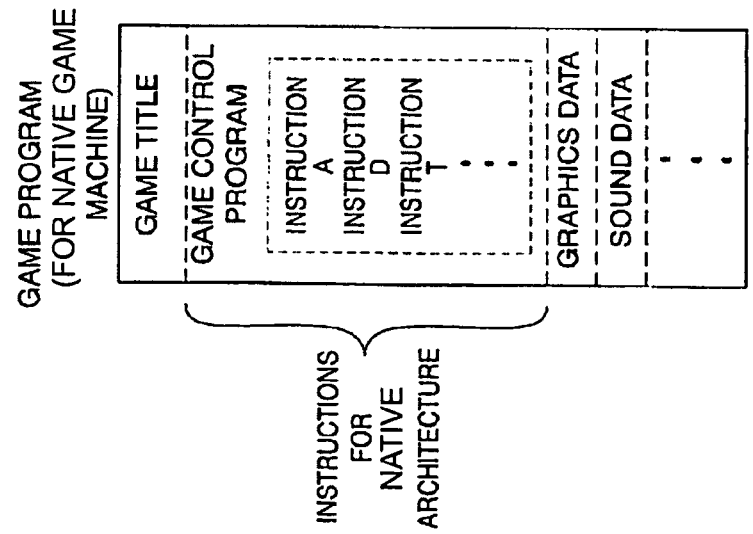

As shown in FIG. 7A, each game program stored in flash memory 332 includes by way of example without limitation a game title, a game control program, graphics data (and/or graphics processing program) and sound data (and/or a sound program). The emulator program for a given game converts the program architecture for that game from an architecture for the game program's native platform to a game program architecture suitable for the target platform (i.e., video game console 200). As shown schematically in FIG. 7B, an example emulator program may include a first emulator for the CPU of the native platform and a second emulator for the graphics processing unit of the native platform. The emulator program can, for example, be realized by an instruction-word conversion table, etc. to convert an instruction for the native game platform into an instruction that is executable by the target video game platform. For example, the instructions "A", "D" and "T" shown in FIG. 7A are generally not directly executable by CPU 304 of video game console 200. These instructions are converted by the emulator program into instructions "a1", "b1" and "t1" which can be executed by CPU 304. Of course, it may not always be the case that there is a one-to-one correspondence between instructions for the native platform and instructions for the target platform. Thus, an instruction for the native platform may in fact be converted into two or more instructions for the target platform.

Additional programs and information may be associated with downloaded video games. These additional programs and information are perhaps most conveniently incorporated into the emulator program for the downloaded video game program, but can easily be provided as separate programs or files. The systems and methods described herein are in no way limited by the manner in which additional programs and information are associated with downloaded video games.

By way of example, a user manual for the game may be downloaded. The manual may include information about the game, how to play the game, tips for playing the game, controller information, etc. By way of further example, a high score program may be included to communicate a user's high score to server 108 for comparison to high scores for other users. By way of still further example, a multi-player program may be provided so that games originally intended, for example, for play by one player can be played by two or more players. By way of still further example, a browser program may also be provided so that the user can navigate through the user manual.

A rental program may also be provided so that the video game program is usable for a specified period of time rather than being "purchased" (i.e., licensed for use for an unlimited period of time). By way of example, the video game program usability may be limited by playing time (e.g., forty hours of game playing time) or by real time (e.g., two months with no limit on the game playing time within those two months). Some games (e.g., previews for new games) may be available only on a rental basis. In other instances, certain games may be offered at one price for purchase and another (generally lower) price for rental. The rental program may be used to allow users to play a video game for a trial time period before deciding to purchase the corresponding video game program.

Flash memory 332 (or some other memory of video game console 200) may also store a history of downloaded video games. In this way, if a particular game is deleted from flash memory 332, the deleted video game program can be "re-downloaded" without the user having to re-purchase the program and incurring additional charges. A similar history can be alternatively or additionally maintained in a memory contained in or accessible to server 108.

Although FIG. 6 shows downloaded games as being stored in flash memory 332, these games may also be stored on memory cards (e.g., SD memory cards) inserted into memory card slot(s) 328.

Various digital rights management (DRM) techniques may be used to control access and usage of the downloaded video games. For example, the downloaded video games may be "locked" to a particular video game console so that the video games can only be played on that console. As such, if a downloaded video game were downloaded and stored on a memory card, that memory card could not be inserted into a different video game console to play the game.

Figure 8A:
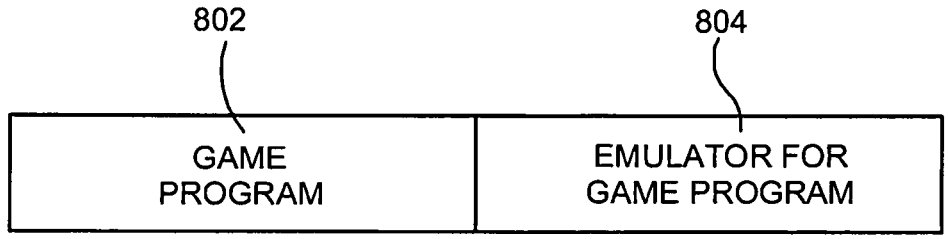
FIGS. 8A-8D show non-limiting examples of data downloaded from server 108 to video game system 102.
Figure 8B:
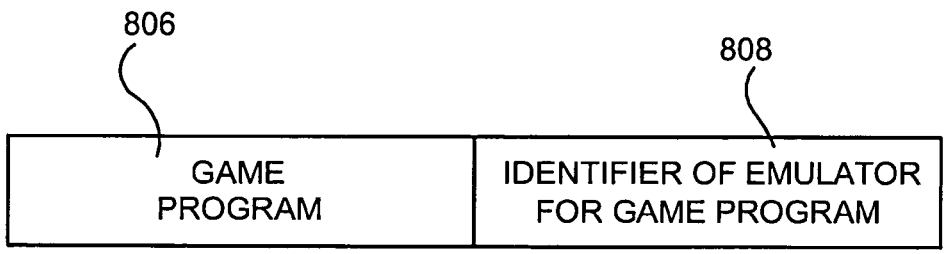
Figure 8C:
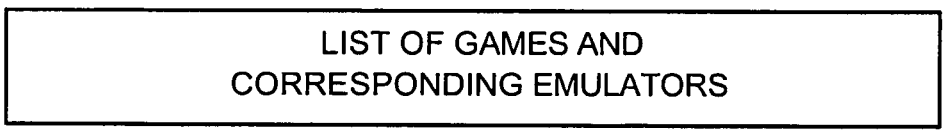
Figure 8D:
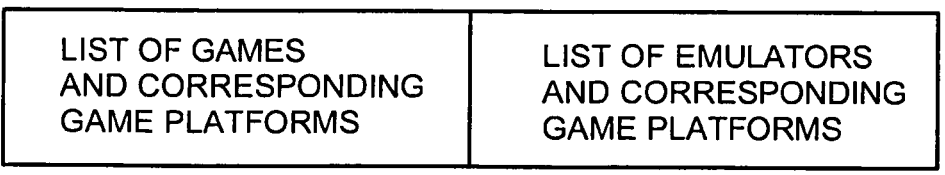
Figures 10A, 10B:
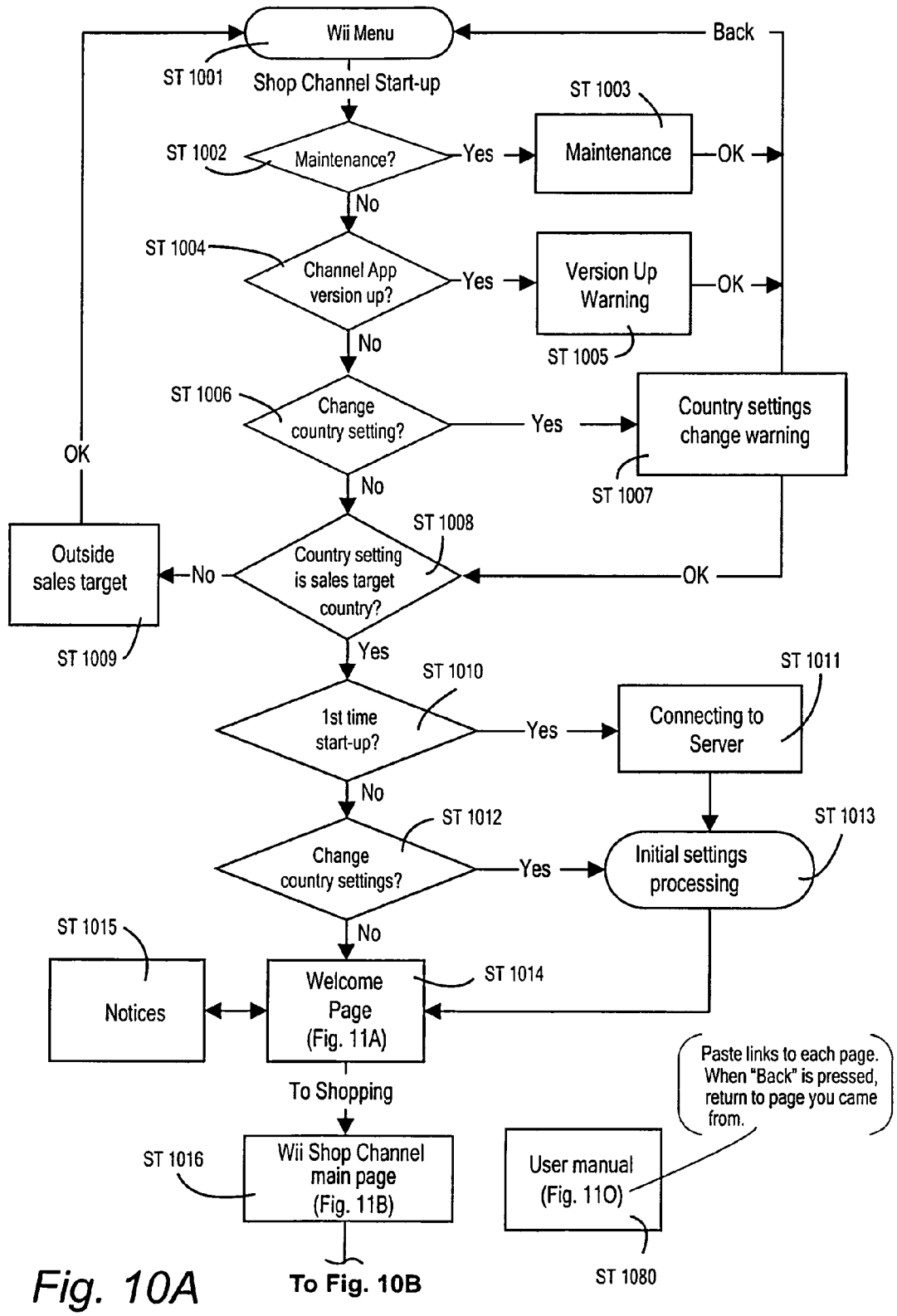
FIGS. 10A-10E are a flow chart showing an example shopping channel process.
Figure 10B:
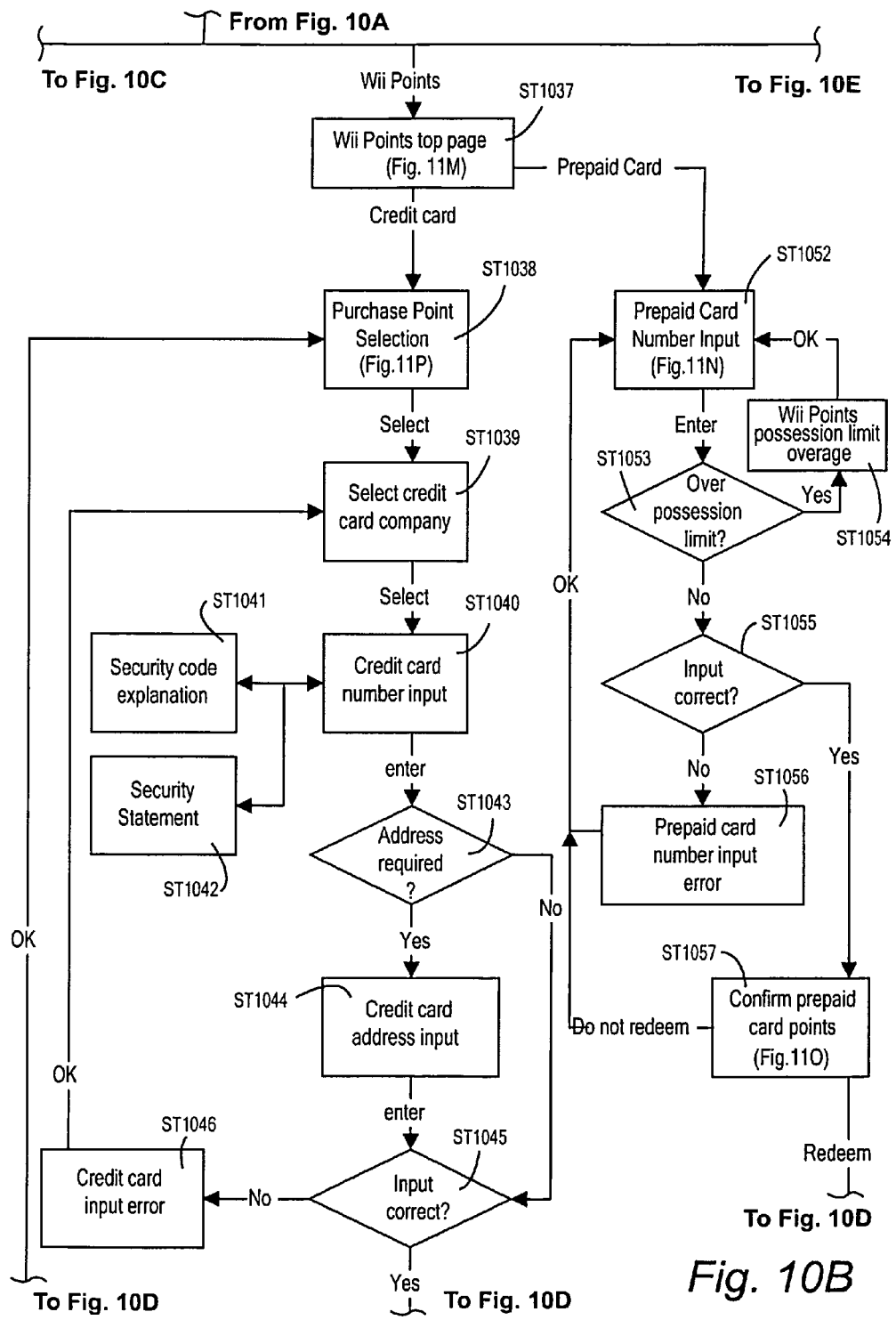
Figure 10C:
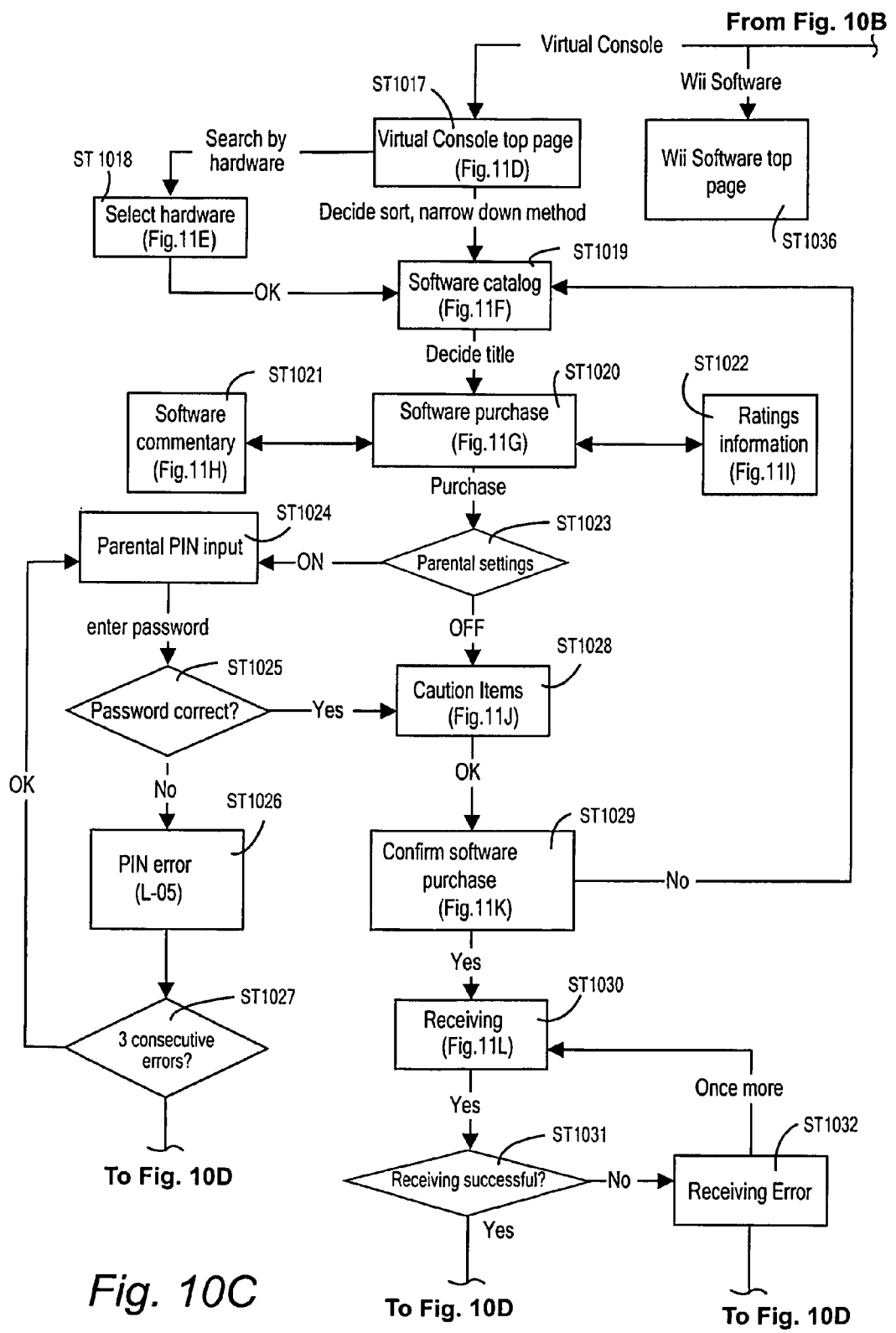
Figure 10D:
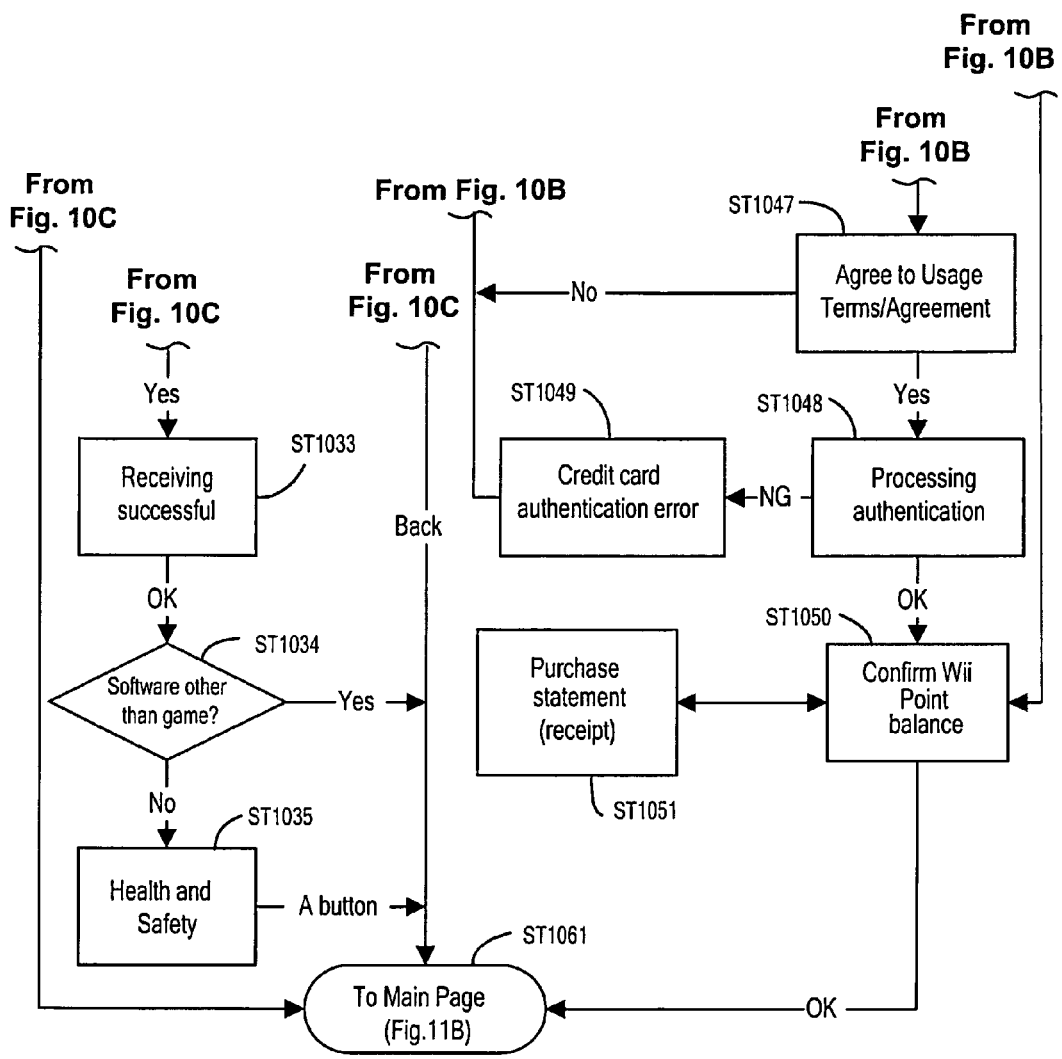
Figure 10E:
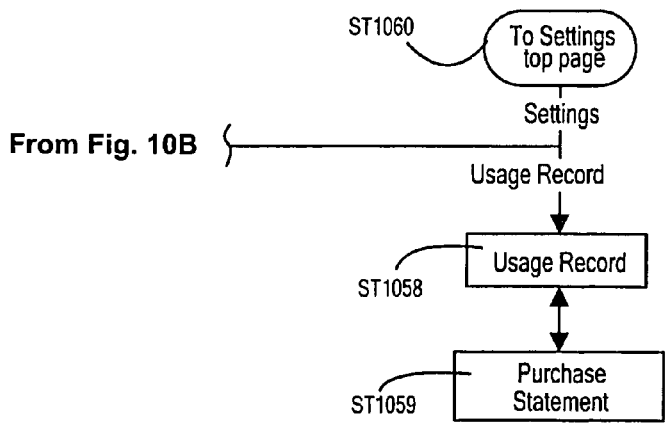

FIGS. 8A-8D show various non-limiting examples of data that can be downloaded from server 108 to video game system 102. FIG. 8A shows that a video game program and an emulator program for that video game program may "bundled" together for downloading. In an alternative implementation, the corresponding emulator program may already be stored by game system 102 (or be accessible thereto) and thus server 108 sends the video game program and an identifier for the emulator program to the game system 102. Game system 102 may use the emulator program identifier to search for the emulator program in its own memory, in memory accessible thereto, or even on the internet. FIG. 8C shows sending a list that relates video game programs to their corresponding emulators. Thus, when a user downloads a particular video game program from server 108, video game system can use the list to identify and retrieve (e.g., from a web site) an emulator appropriate for the downloaded video game program. FIG. 8D shows sending a first list relating video game programs to their native platforms and a second list of emulator programs and the platforms emulated by these emulators. Thus, if a user downloads a video game program for a particular platform, video game system 102 can use the lists of FIG. 8D to identify and retrieve an appropriate emulator program.

FIGS. 10A-10E are a flow chart showing an example shopping channel process flow when the shopping channel 506 is selected from the channel menu shown in FIG. 5. The shopping channel allows users to, among other things, shop for and purchase (or possibly rent) video game programs. When the user finds a video program that he or she would like to download, the user selects the desired video game program. The selected video game program and its corresponding emulator are then downloaded to video game console 200.

The process flow begins with the display of the channel menu of FIG. 5 at ST 1001. When the shopping channel 506 is selected using controller 207, the process determines at ST 1002 whether the shopping channel is undergoing maintenance. If so, a display to this effect is displayed at ST 1003 and the process returns to ST 1001. If not, the process determines at ST 1004 whether a shopping channel update is available. If an update is available, a display prompting the user to obtain the update is displayed at ST 1005 and the user is invited to return to the shopping channel when the update is obtained. The process then returns to ST 1001. The update may, for example, be an update to the shopping channel program stored in flash memory 332 that provides additional channels, new features, and the like.

If no update is available, the process determines at ST 1006 whether the country currently selected in the settings for video game console 200 has changed since the last time the user connected to the shopping channel. If so, the user is warned at ST 1007 that the country setting has changed and is asked to confirm that the new setting is okay. If the user confirms that the new setting is okay, the process proceeds to ST 1008. Otherwise, the process returns to ST 1001 where the channel menu of FIG. 5 is displayed (i.e., the shopping channel program is ended).

At ST 1008, the process determines whether the currently selected country is one in which the shopping channel is available. If the shopping channel is not available in the currently selected country, a display to this effect is displayed at ST 1009 and the process then returns to ST 1001 where the channel menu of FIG. 5 is displayed. If the shopping channel is available in the currently selected channel, the process determines at ST 1010 whether this is the first time the user has accessed the shopping channel. If so, the process provides a display at ST 1011 asking the user to wait until a connection is established with server 108 for initial settings processing at ST 1013.

If this is not the first time the user has accessed the shopping channel the process proceeds from ST 1010 to ST 1012 where the process determines whether the current country setting is changed from the country setting the last time the shopping channel was accessed. If so, the process proceeds to the initial settings processing at ST 1013. If not, the process proceeds to ST 1014.

The initial settings processing allows the user to set various shopping channel options. For example, certain countries or regions may have so-called "loyalty" accounts where certain purchases may result in user benefits such as discounts on future purchases, free gifts for a certain amount of total purchases, etc. The initial settings processing allows a user to link his or her shopping channel account activities to this loyalty account. The initial settings processing also allows a user to delete his or her shopping channel account. The user may want to delete an account if, for example, the video game console associated with the account is being sold to another user. After initial settings processing, the process proceeds to ST 1014.

Figure 11A:
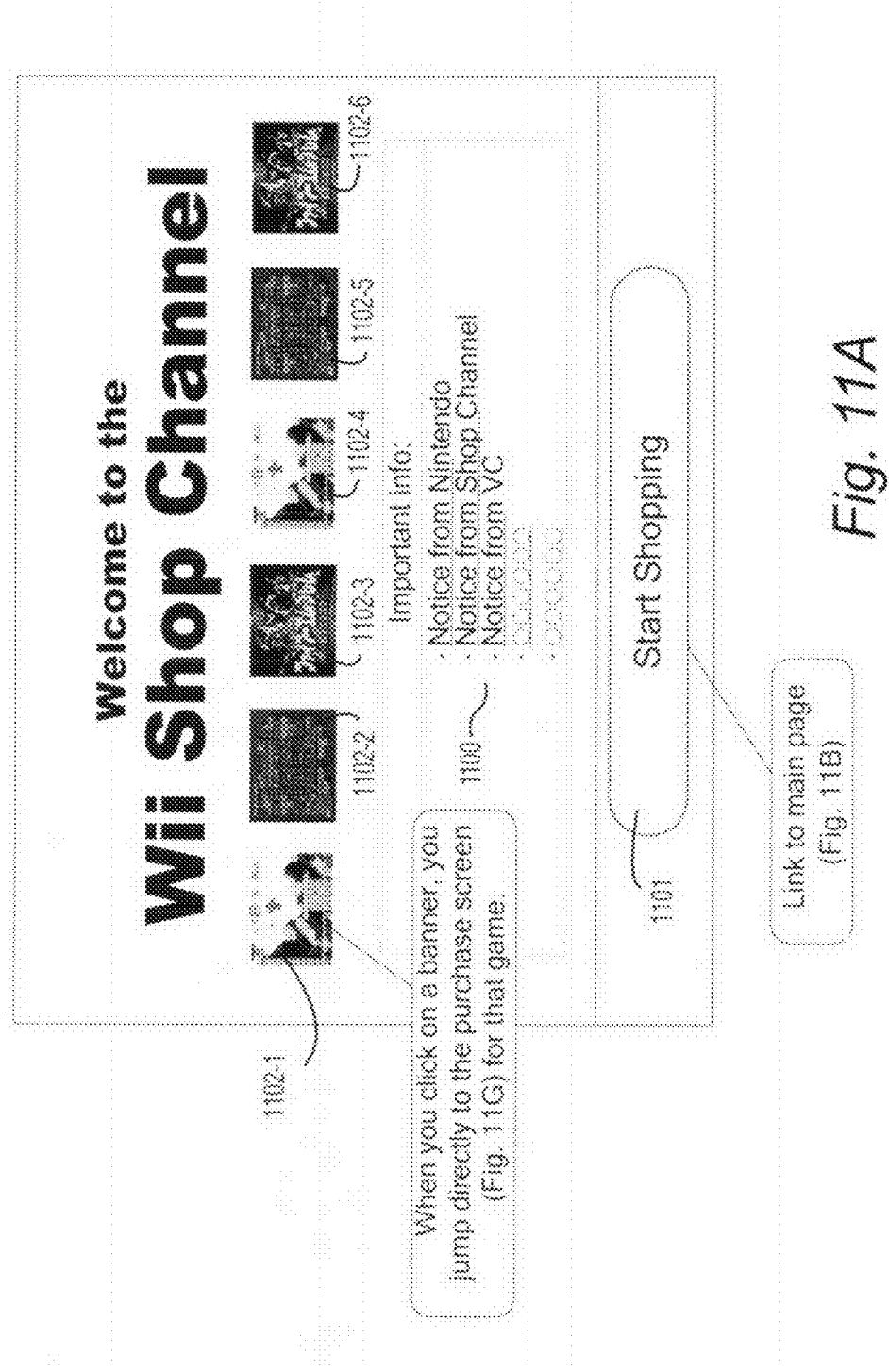
FIGS. 11A-11Q are non-limiting example screens used in the example shopping channel process.

At ST 1014, a welcome screen is displayed. A non-limiting example welcome screen is shown in FIG. 11A. The welcome screen may contain links 1100 to one or more notices about product availability, pricing, shipping information and the like. The user may select one of the links 1100 whereby the process proceeds to ST 1015 to display the notice corresponding to the selected link. The display of the notice at ST 1015 includes a link for returning back to the display of the welcome screen. The welcome screen of FIG. 11A also contains a "start shopping" link 1101 which can be selected by the user to proceed to the display of a shopping channel main screen at ST 1016. The welcome screen also includes a number of banner icons 1102-1, 1102-2 . . . 1102-6 showing video programs available for download. Selection of one of these banner icons provides a short-cut to ST 1020 for purchasing the video game program corresponding to the selected icon.

Figure 11B:
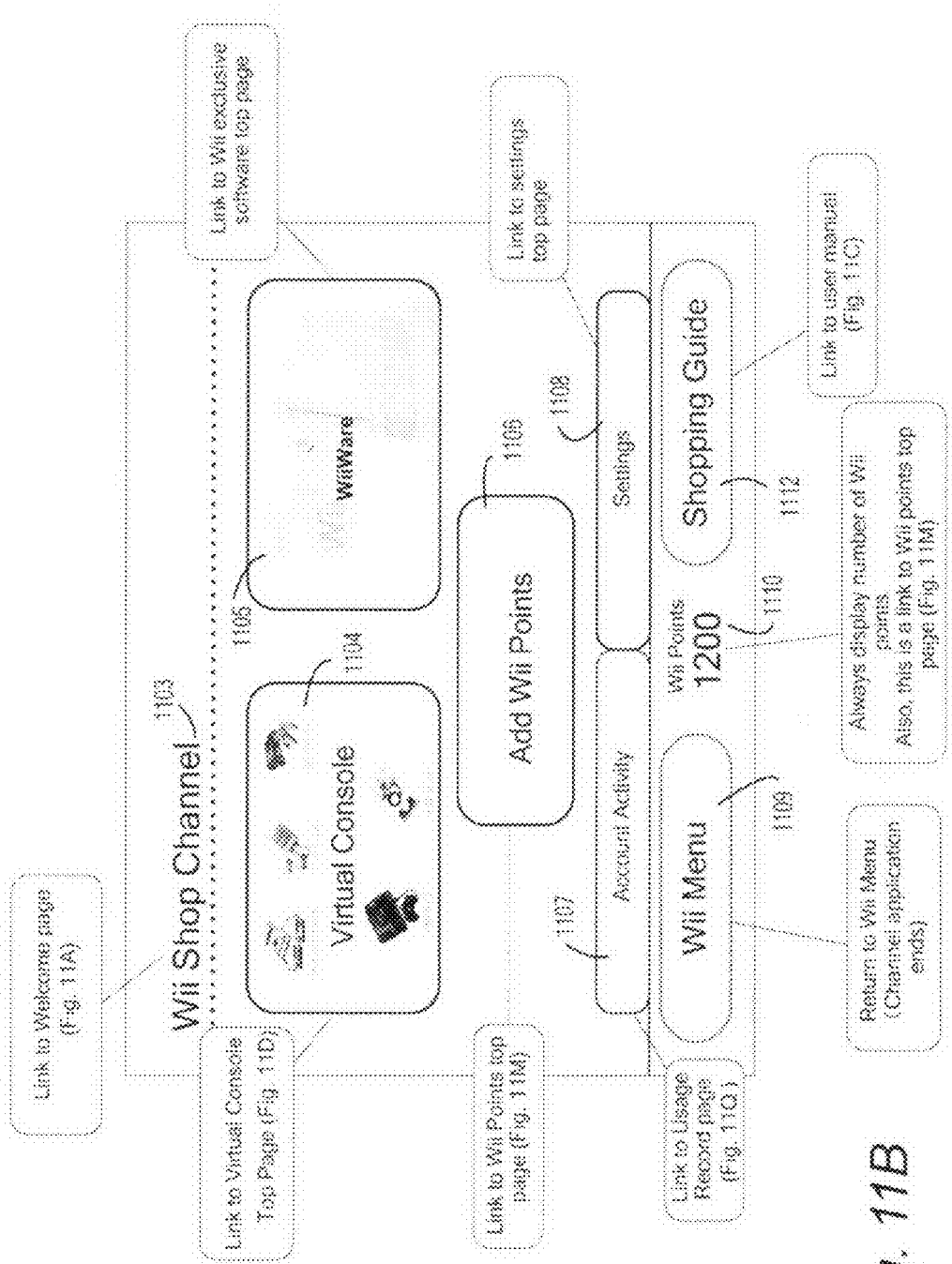

At ST 1016, a shopping channel main screen is displayed. A non-limiting example main screen is shown in FIG. 11B. The main screen includes a link 1103 back to the welcome screen of FIG. 11A. The main screen also includes links 1104, 1105, 1106, 1107 and 1108 which cause the process to proceed to ST 1017, ST 1036, ST 1037, ST 1058 and ST 1060, respectively. Each of these steps of the process will be described in greater detail below.

Figure 11D:
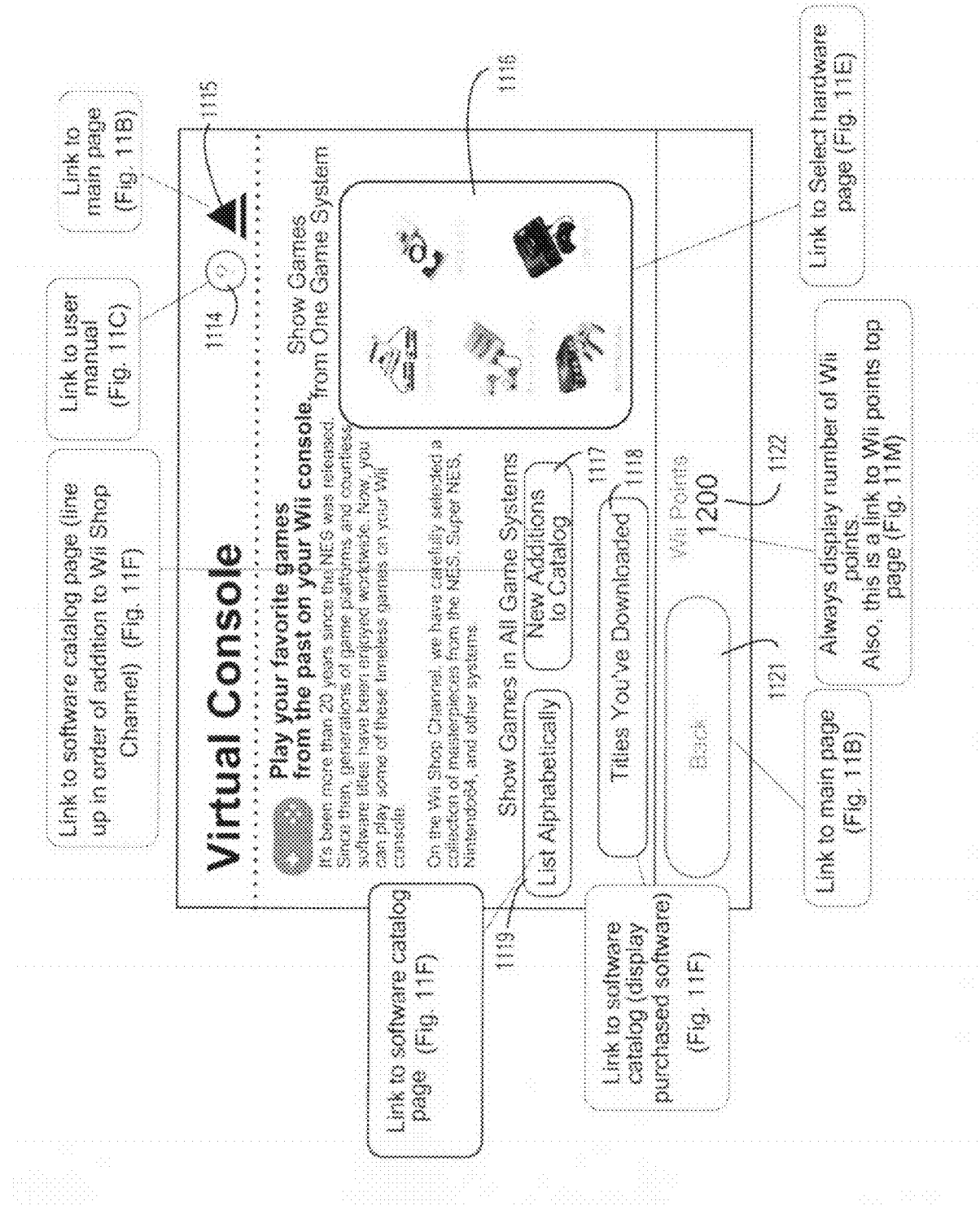
Figure 11E:
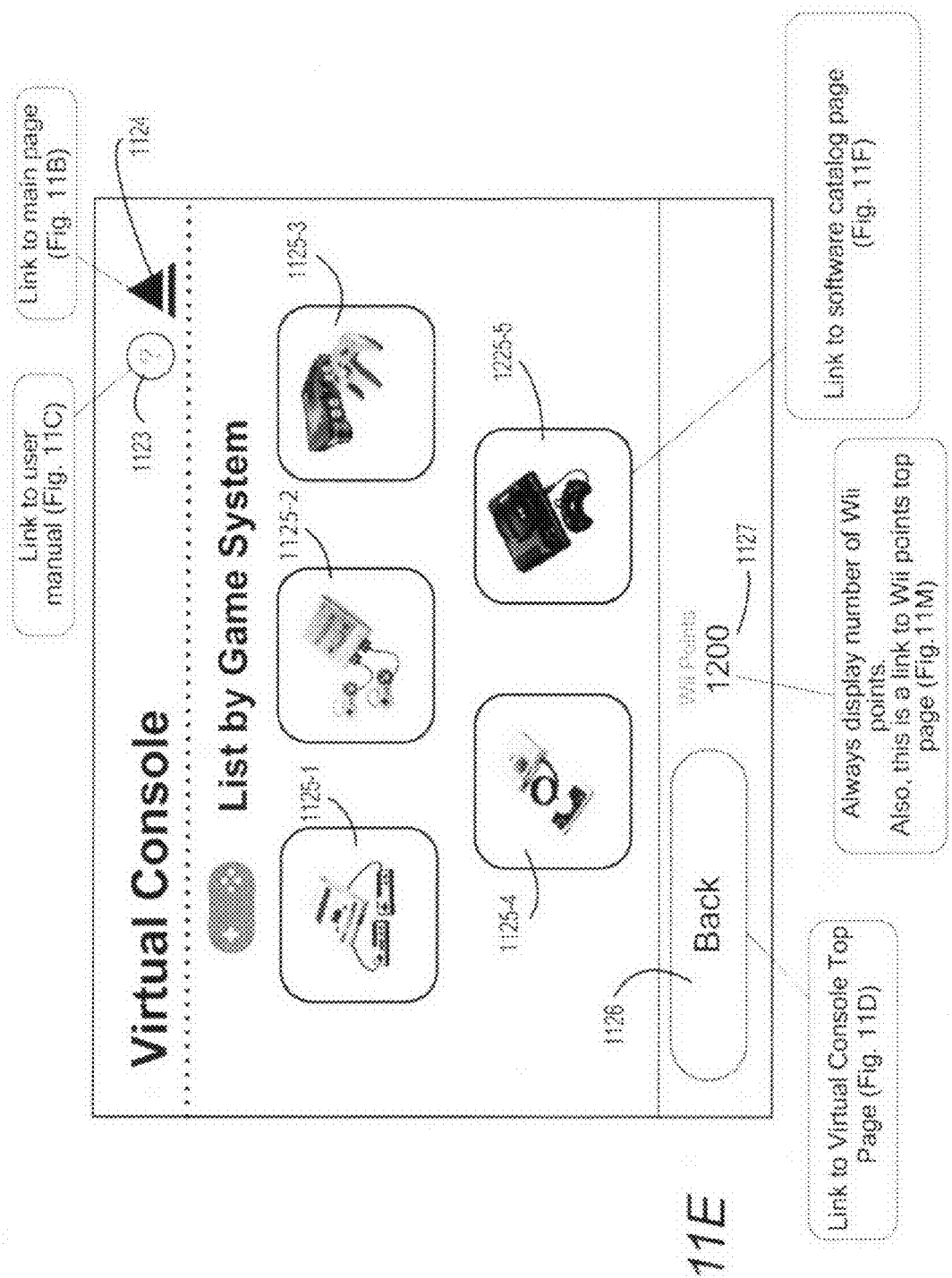

At ST 1017, a virtual console top (or main) page is displayed. A non-limiting example top main page is shown in FIG. 11D. The main page of FIG. 11D includes links 1117 and 1119 to a video game program catalog page shown in FIG. 11F. Selecting link 1117 results in the video game programs on the catalog page being ordered in terms of their addition to the shopping channel while selecting link 1119 results in the video game programs on the catalog page being alphabetically ordered. Selecting link 1116 brings the user to a hardware select page, a non-limiting example of which is shown in FIG. 11E. Selecting link 1114 brings to the user to a help manual page, an example of which is shown in FIG. 11C. Selecting link 1115 brings the user back to the main screen of FIG. 11B. Selecting link 1121 brings the user back to previous page. Link 1122 provides a display of shopping points and, if selected, brings the user to a shopping points top page, a non-limiting example of which is shown in FIG. 11M.

In response to the user selecting link 1117 at ST 1017, the process proceeds to a video catalog display at ST 1019 which is ordered in terms of the times at which the games became available in the catalog. In response to the user selecting link 1119 at ST 1017, the process proceeds to a video catalog display at ST 1019 which is alphabetically ordered. In response to the user selecting link 1116 at ST 1017, the process proceeds to ST 1018. At ST 1018, the user selects a particular game platform and the process proceeds to a video catalog display at ST 1019 which is limited to available video game programs for the platform selected at ST 1018.

The hardware selection screen of FIG. 11E shows graphical links 1125-1, 1125-2, 1125-3, 1125-4 and 1125-5, each of which corresponds to a different video game platform. Selecting one of these graphical links results in the video game catalog of FIG. 11F being limited to video game programs for the platform corresponding to the selected link. The screen of FIG. 11E also includes a link 1123 for bringing the user to a help manual page and a link 1124 for bringing the user back to the main screen of FIG. 11B. Link 1126 is for bringing the user back to previous page and link 1127 provides a display of shopping points and, if selected, brings the user to a shopping points top page.

In still other example implementations, the video game programs in the catalog can be ordered or listed/not listed on the basis of game characters, genre, publisher, parental rating or any other relevant characteristic of the video game programs.

Figure 11F:
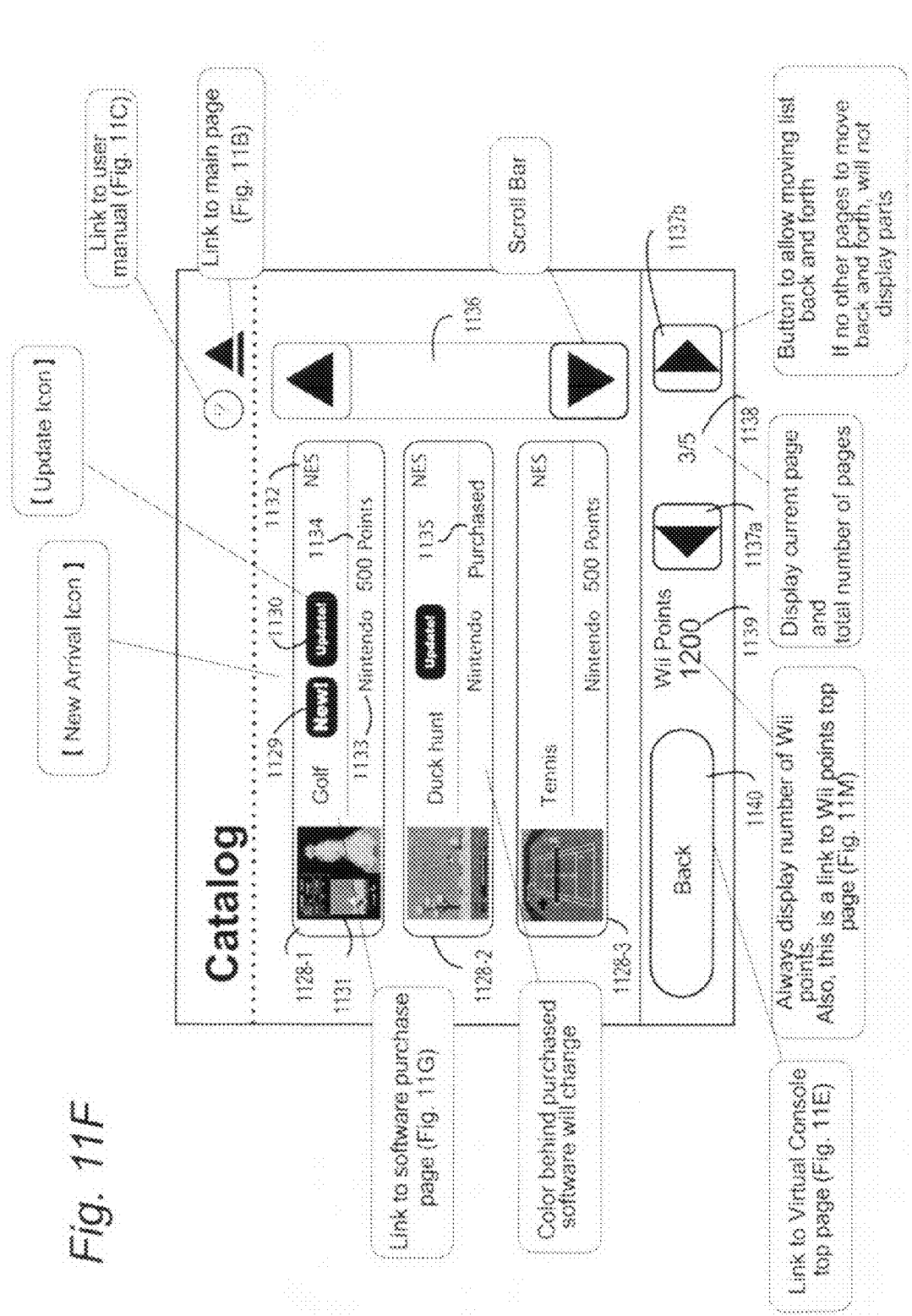

The video game program catalog page shown in FIG. 11F contains multiple links 1128-1, 1128-2 and 1128-3, each of which corresponds to a different game. Link 1128-1 include a "new arrival icon" indicating that the corresponding video game program was recently added to the catalog (e.g., within some specified number of days before the current day), an update icon 1130 indicating the availability of an update for the corresponding video game program, a screen shot 1131 from the corresponding video game program, a platform designator 1132 designating the native platform for the corresponding video game program, publisher information 1133 identifying the publisher of the corresponding video game program and a price indicator 1134 indicating the purchase price of the corresponding game. In the FIG. 11F example, price is expressed in terms of points, where each point corresponds to an amount of money (e.g., $0.01). Of course, the price information may be displayed in various manners including as a monetary amount. If the game has already been purchased, a "purchased" indicator 1135 is provided in place of the price indicator. The video game program catalog page includes a scrolling bar for scrolling the display to see additional video game links on the page. The catalog may include multiple pages and these multiple pages are accessible using the left and right arrows 1137*a* and 1137*b*. A current page/total page indicator 1138 indicates the current page and the total number of pages (e.g., the indicator 1138 indicates that the user is viewing page 3 of 5 total pages). A back link 1140 brings the user back to the previous page and link 1139 provides a display of shopping points and, if selected, brings the user to a shopping points top page.

Figure 11G:
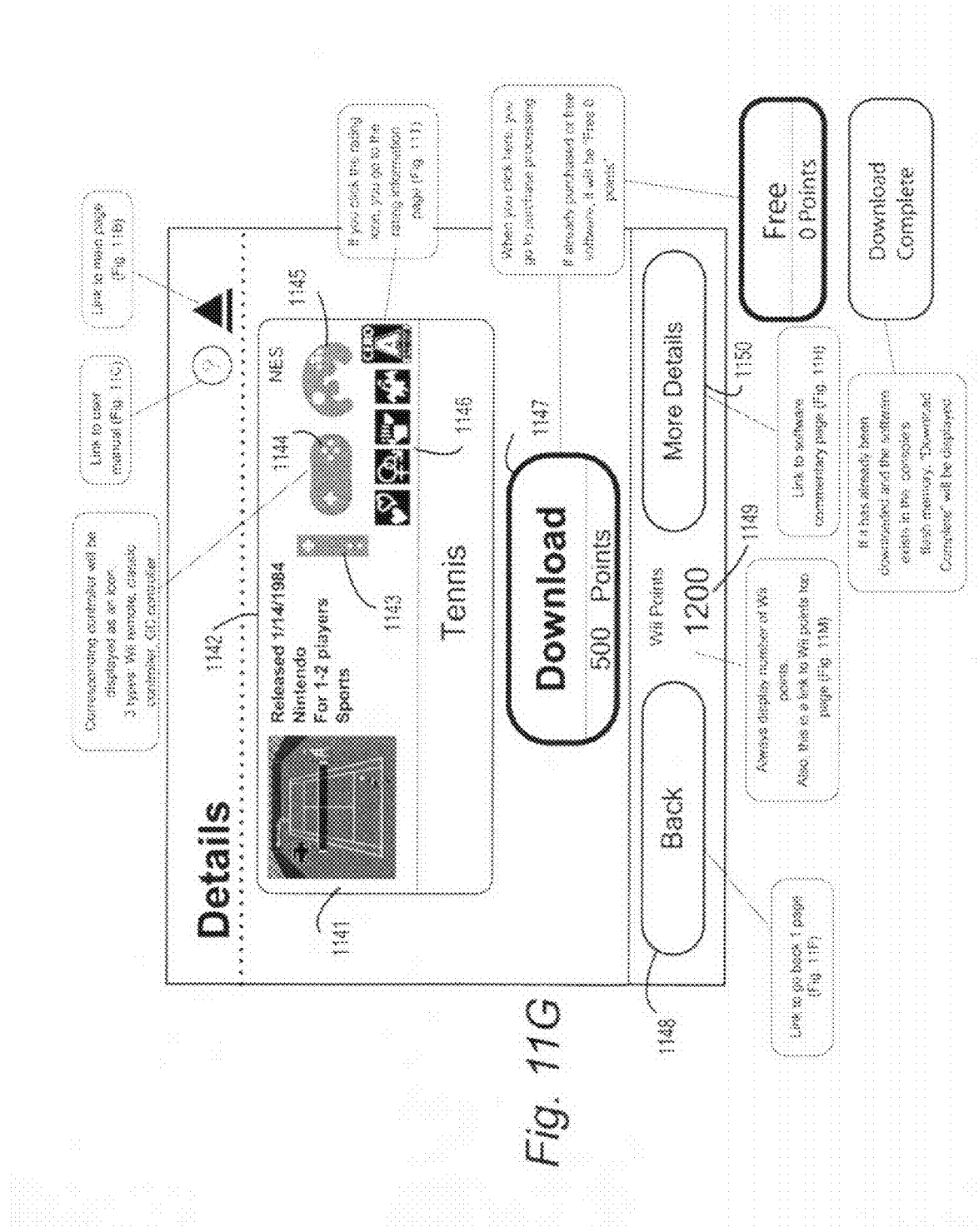
Figure 11H:
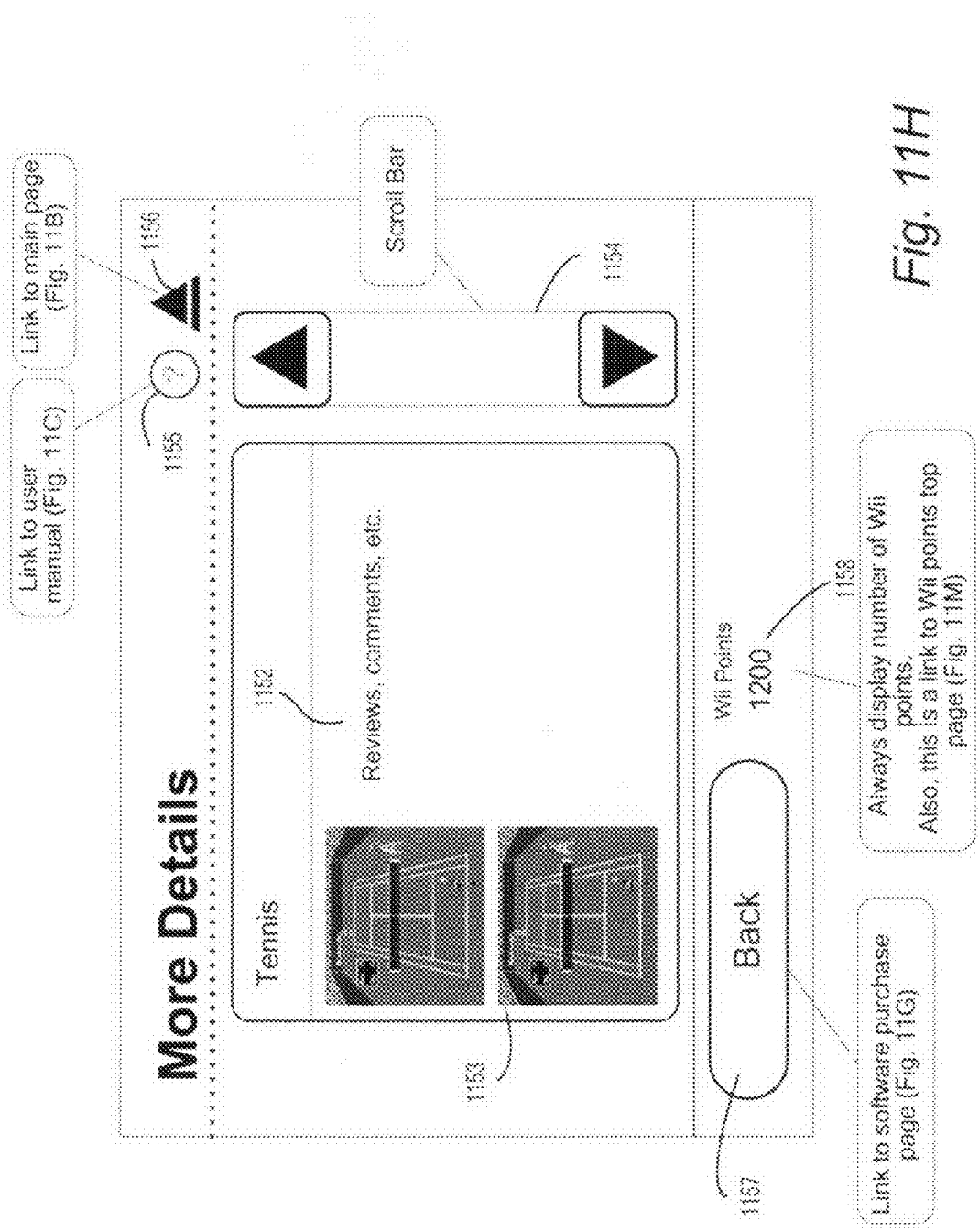
Figure 11I:
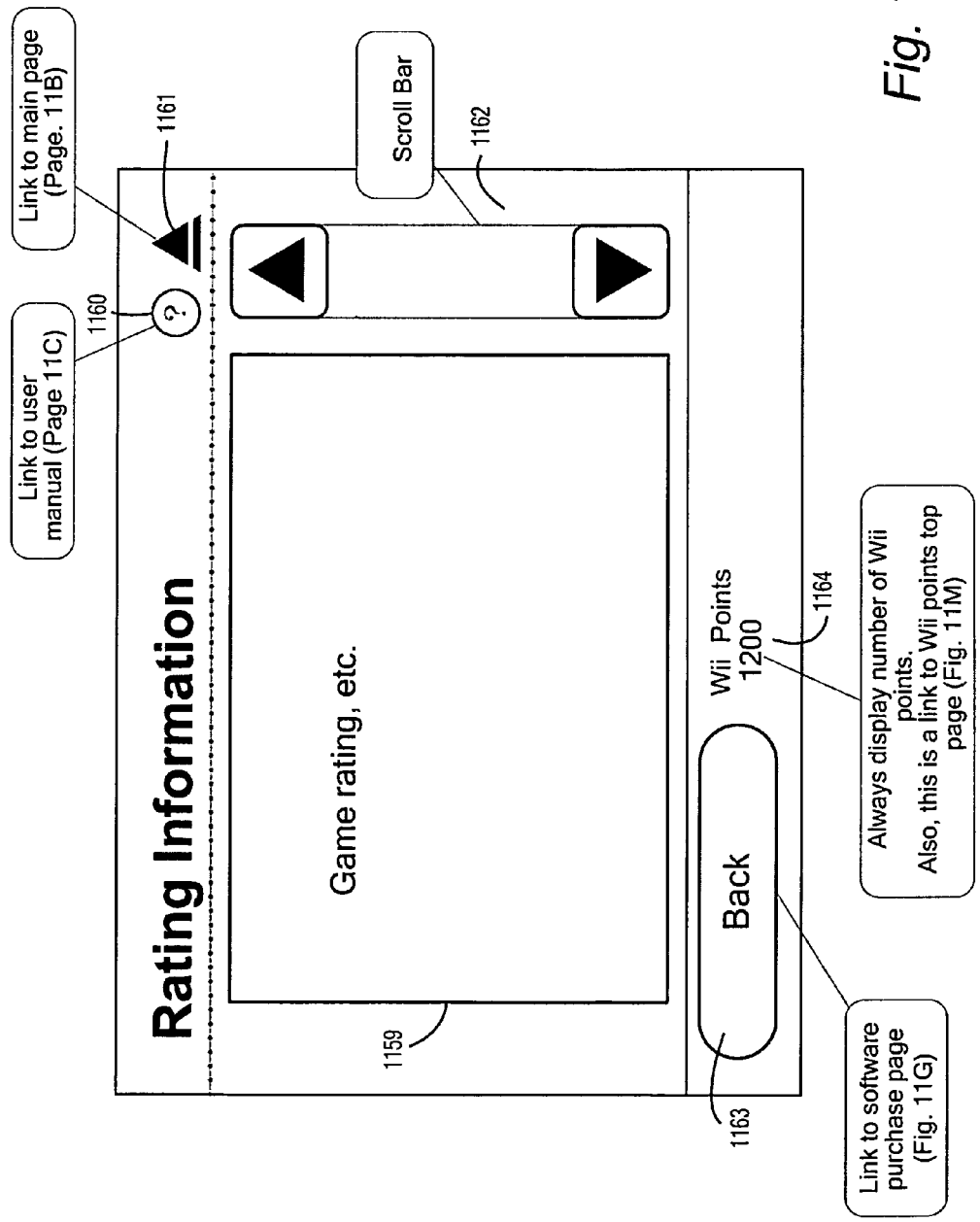

When the user selects one of the links on the FIG. 11F screen at ST 1019, the process proceeds to ST 1020. At ST 1020, a software purchase screen is displayed, a non-limiting example of which is shown in FIG. 11G. The screen of FIG. 11G includes game details such as a screen shot 1141, general game information 1142 (e.g., video game release date, publisher information, number of players, game genre and the like), and controller icons 1143, 1144 and 1145 indicating the types of controllers that can be used to play the game. The game details also include game rating information 1146 and selecting a rating icon brings the user to a rating information page, a non-limiting example of which is shown in FIG. 11I. The FIG. 11G screen also includes a back link 1148 for bringing the user back to the previous page, a points display/link 1149 and a "more details" link 1150 that a user can select to find out additional details about the video game. A download link 1147 indicates the price of the game (e.g., 500 points). If the game has previously been purchased, the price indicator indicates that the game is "free" (e.g., 0 points).

If the user selects the "more details" link 1150 at ST 1020, the process proceeds to ST 1021. At ST 1021, a "more details" screen is displayed, a non-limiting example of which is shown in FIG. 11H. If the user selects a rating icon 1146 at ST 1020, the process proceeds to ST 1022. At ST 1022, a "rating information" screen is displayed, a non-limiting example of which is shown in FIG. 11I. If the user selects download link 1147 at ST 1020, the process proceeds to ST 1023.

The "more details" screen of FIG. 11H provides further details about the corresponding video game program. By way of example without limitation, the further details include text 1152 (e.g., detailed description, player comments, reviews, etc.) and multiple (e.g., two) screen shots 1153 from the video game. A scroll bar 1154 allows the user to scroll the display up and down. The "more details" screen also includes a link 1155 for bringing the user to a help screen; a link 1156 for bringing the user back to the shopping channel main page of FIG. 11B; a "back" link 1157 for bringing the user back to the previous page (e.g., the purchase screen of FIG. 11G); and a points indicator/link 1158.

The "rating information" screen of FIG. 11I provides further details of the rating for the corresponding video game program. For example, the Entertainment Software Rating Board (ESRB) provides ratings for video games in the United States and Canada (e.g., E for everyone; T for teen; M for mature; etc.). The "rating information" screen may include text 1159 setting forth the rating and the game content on which the rating is based. A scroll bar 1162 allows the user to scroll the display up and down. The "rating information" screen also includes a link 1160 for bringing the user to a help screen; a link 1161 for bringing the user back to the shopping channel main page of FIG. 11B; a "back" link 1163 for bringing the user back to the previous page (e.g., the purchase screen of FIG. 11G); and a points indicator/link 1164.

At ST 1023, the process determines whether parental settings have been turned on. Parental settings allow parents or guardians to limit a child's access to, for example, only those games having a rating lower than a parentally set rating. By way of illustration, a parent may limit a child's access to games having a "T for teen" rating or lower. This would prevent a child from accessing games having an "M for mature" rating. By way of further illustration, the parental settings may be used to condition the downloading of any game upon entry of a parental PIN code. Thus, the parent may control the downloading of games.

If the parental settings are off, the process proceeds to ST 1028. At ST 1028, a "caution" screen is displayed. A non-limiting example of a "caution" screen is shown in FIG. 11J.

If the parental settings are on, the process proceeds to ST 1024. At ST 1024, the user is prompted to enter a parental PIN number. The process determines at ST 1025 whether the entered parental PIN number is correct. The correctness of the entered PIN number may be determined, for example, by comparing the entered PIN number with a previously entered PIN stored in flash memory 332 of video game console 200. If the entered PIN number is correct, the process proceeds to ST 1028 at which the "caution" screen is displayed as noted above.

If the entered PIN number is not correct, the process proceeds to ST 1026. At ST 1026, a screen indicating that an incorrect PIN number has been entered is displayed and the process then proceeds to ST 1027 where the process determines whether three consecutive PIN entry errors have occurred. If not, the process returns to ST 1024 and the user can re-enter the PIN number. If so, the process proceeds to ST 1061 and the main shopping channel screen of FIG. 11B is displayed.

The "caution" screen of FIG. 11J includes information 1165 cautioning the user that a certain type of controller(s) is needed to play the game. If the user does not possess one of the required types of controllers, the user may decide to end the download process. The "caution" screen also includes a link 1166 for bringing the user to a help screen; a link 1167 for bringing the user back to the shopping channel main page of FIG. 11B; a "back" link 1168 for bringing the user back to the previous page (e.g., the purchase screen of FIG. 11G); a points indicator/link 1169; and an "ok" link 1170 for bringing the user to a "confirm purchase" screen. The "ok" link is selected if the user wishes to continue the video game program purchase process.

Figure 11K:
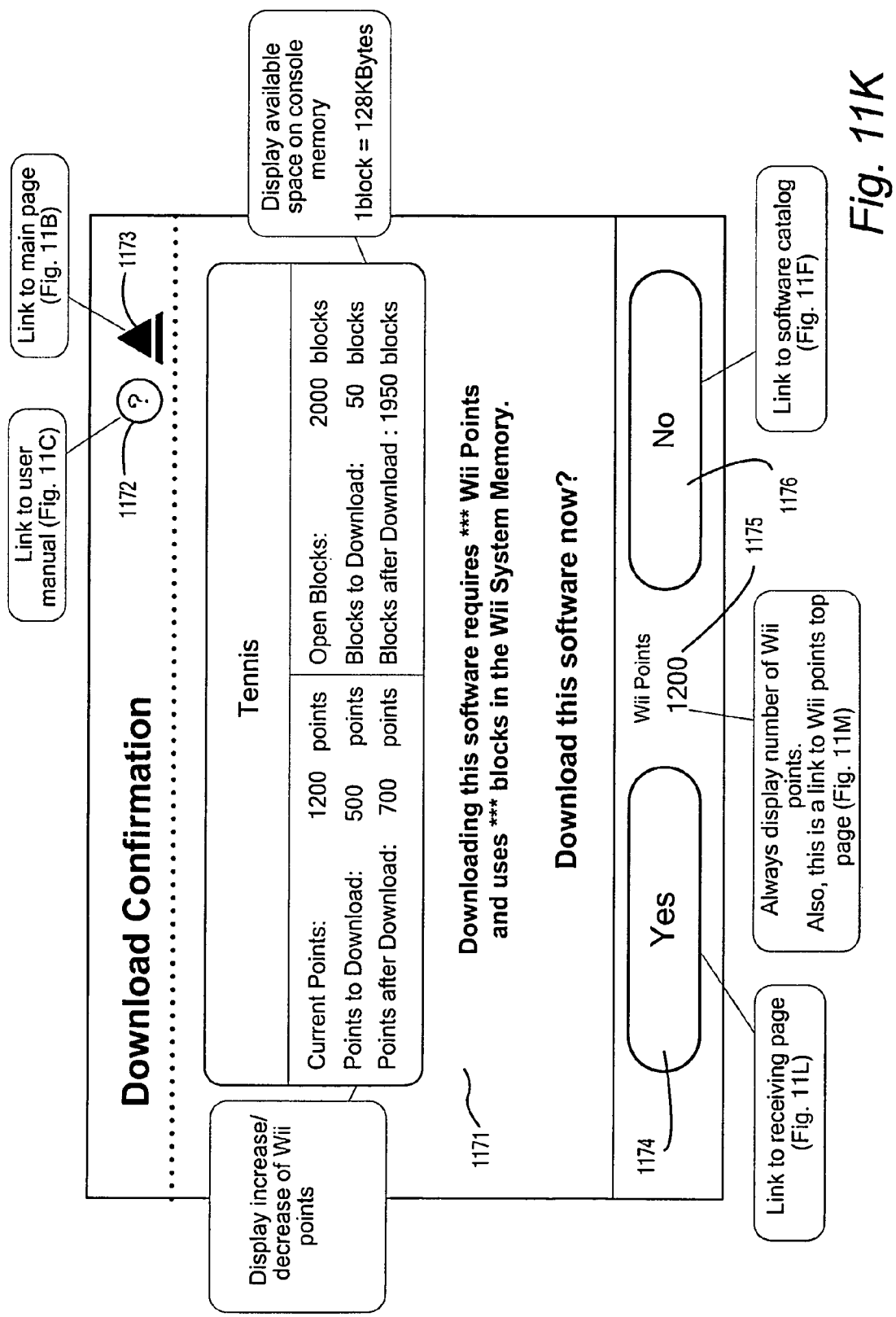

If the user selects the "ok" link from the screen of FIG. 11J at ST 1028, the process proceeds to ST 1029. At ST 1029, a "confirm purchase" screen is displayed. A non-limiting example of a "confirm purchase" screen is shown in FIG. 11K. The "confirm purchase" screen of FIG. 11K includes information 1171 such as a user's current number of points, the number of points required for the download and the number of points that will remain after the download. Information 1171 may also show the number of open blocks in the flash memory 332 of the user's console, the number of blocks contained in the downloaded video game program and the number of blocks that will remain in the flash memory after the download. If the user wishes to download the video game program after reviewing this information, "yes" link 1174 is selected. If the user wishes to terminate the downloading process, "no" link 1176 is selected. The "confirm purchase" screen also includes a link 1172 for bringing the user to a help screen; a link 1173 for bringing the user back to the shopping channel main page of FIG. 11B, and a points indicator/link 1175.

If the user selects the "no" link 1176 from the "confirm purchase" screen at ST 1029, the process returns to ST 1019.

Figure 11L:
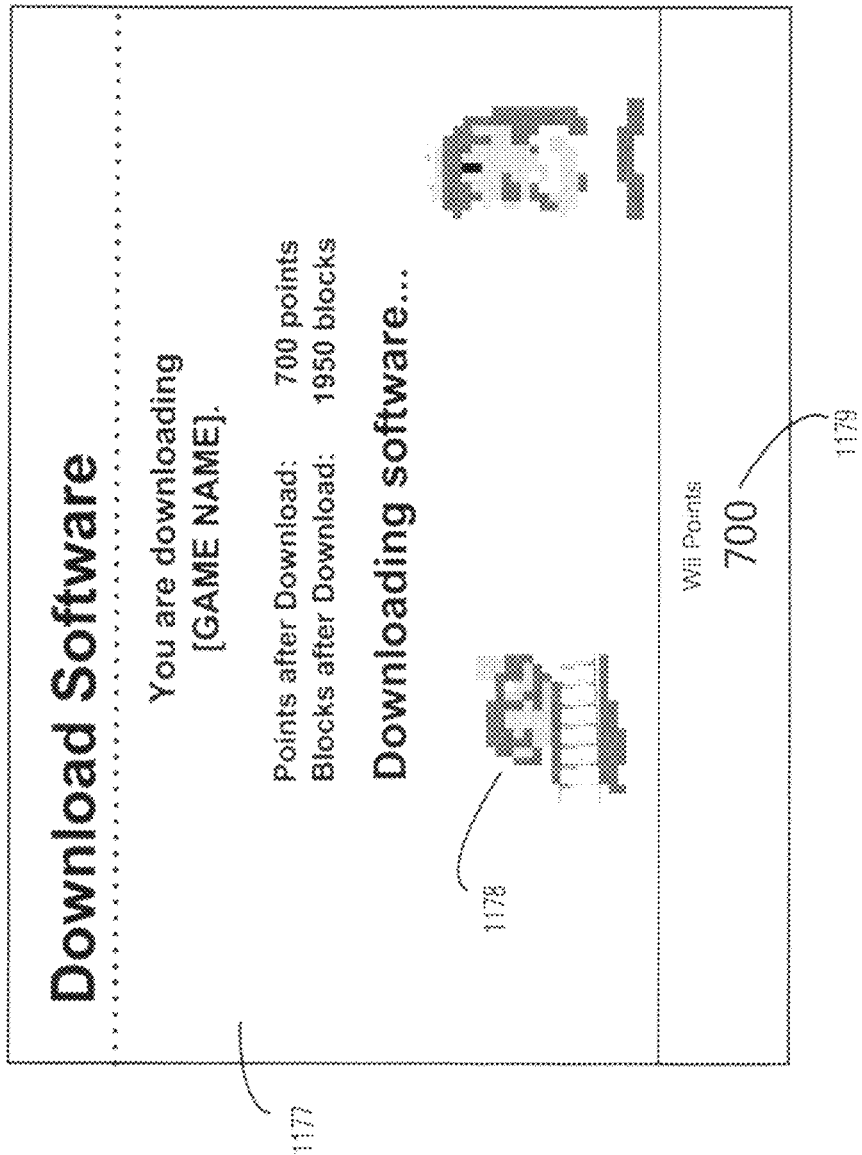

If the user selects the "yes" link 1174 from the "confirm purchase" screen at ST 1029, the process proceeds to ST 1030. At ST 1030, a "receiving software" screen is displayed. A non-limiting example of a "receiving software" screen is shown in FIG. 11L. The "receiving software" screen is displayed while the selected video game and its corresponding emulator are being downloaded and includes information 1177 indicating the name of the game being downloaded, the number of points the user will have after the download and the number of free flash memory blocks the console will have after the download. A graphic download progress indicator 1178 may be used to indicate the progress of the download. The "receiving software" screen also includes a points indicator 1179. In this example process, points indicator 1179 does not function as a link to some other display screen.

After the receiving at ST 1030, the process determines at ST 1031 whether the program was received successfully. If not, the process proceeds to ST 1032 where a receiving error screen is displayed. The receiving error screen informs that user that there was an error downloading the video game program and provides the user an opportunity to try again to download the game. If the user opts to try another download, the process returns to ST 1030. If this download is not successful as determined at ST 1031, the error screen is displayed after which the process proceeds to ST 1061 and the display of the main shopping channel page shown in FIG. 11B. The error screen may include, for example, information (e.g., website, telephone number) for assistance along with an error number for the particular error that occurred during the download. This error number can be used when the website is visited or the telephone number called to identify the error and its possible solutions.

If the process determines at ST 1031 that the game is successfully downloaded, the process proceeds to ST 1033 and a "receiving successful" screen is displayed. After reviewing the contents of the "receiving successful" screen, the user can select a link on the screen (e.g., an "ok" link) and the process then proceeds to ST 1034. At ST 1034, the process determines whether software other than a video game has been downloaded. If so, the process proceeds to ST 1061. If not (i.e., a video game has been downloaded), a health and safety screen is displayed at ST 1035. After reviewing the health and safety screen, the user may actuate a specified button on controller 207 and the process then proceeds to ST 1061.

At ST 1016, the user may select link 1105 and the process proceeds to ST 1036. At ST 1036, a top screen for downloading software developed for console 200 is displayed. From this top screen, the user may access other screens (not shown) for downloading the software.

At ST 1016, the user may select link 1106 to add "points" to the user's account and the process then proceeds to ST 1037. At ST 1037, an "add points" screen is displayed. A non-limiting example "add points" screen is shown in FIG. 11M. The "add points" screen includes information 1180 about points and shows an image of a pre-paid card of 1000 points. The user may add points by selecting link 1183 to redeem a pre-paid points card or by selecting link 1184 to buy points using a credit card. The "add points" screen also include a link 1181 for bringing the user to a help screen; a link 1182 for bringing the user back to the shopping channel main page of FIG. 11B; a "back" link 1185 for bringing the user back to the previous page (i.e., the main shopping channel screen of FIG. 11B); and a points indicator 1186. In this example process, points indicator 1186 does not function as a link to any other display screen.

Figure 11N:
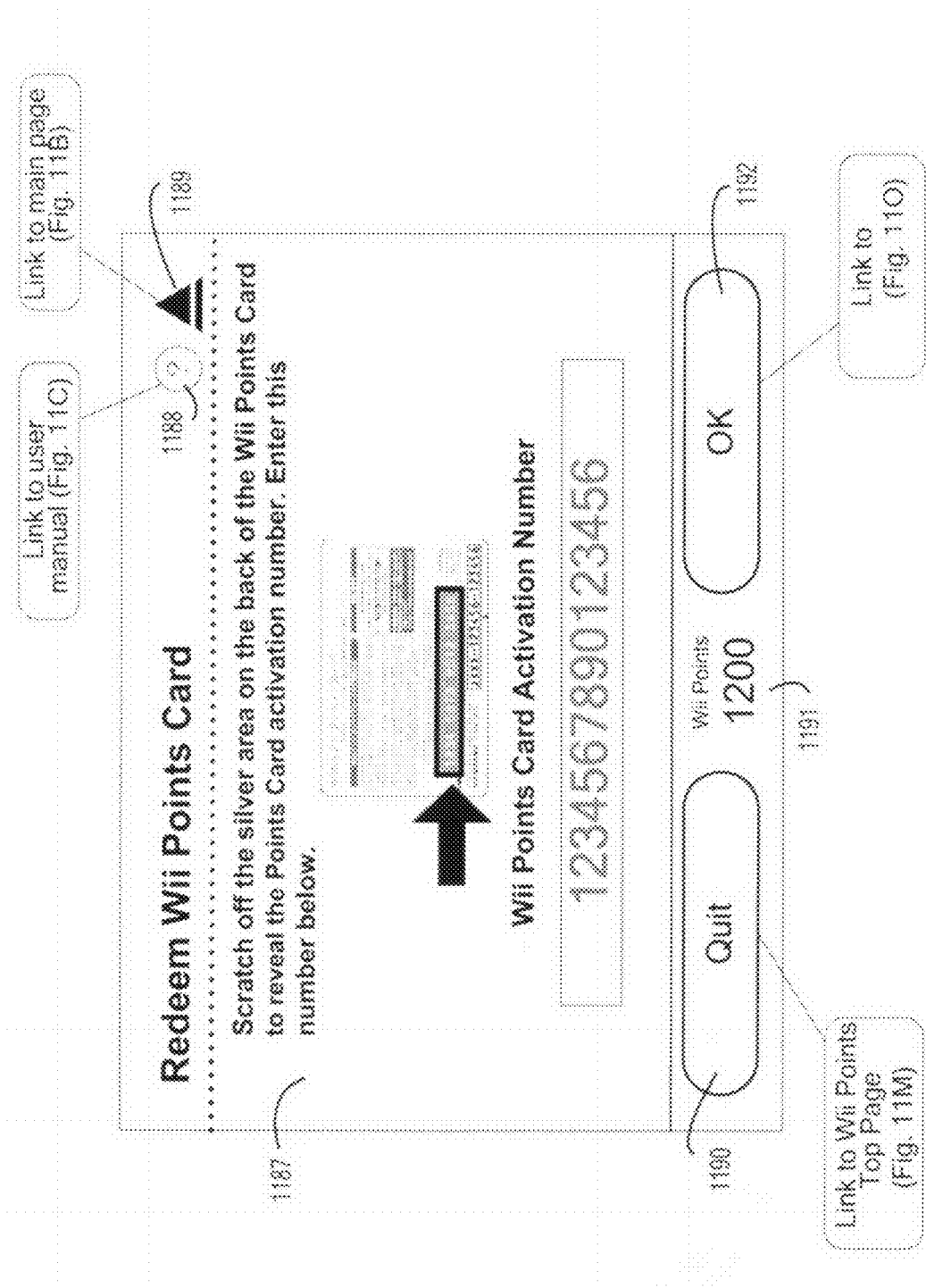

If the user selects link 1183 for redeeming a pre-paid points card at ST 1037, the process proceeds to ST 1052. At ST 1052, a "card number input" screen is displayed. A non-limiting example "card number input" screen is shown in FIG. 11N. The screen provides information 1187 about how to find a card activation number. In one example implementation, the activation number is found by scratching off material from the back of the card to reveal the number. The screen also includes an area for inputting the activation number. If the user positions a cursor on the input area and "clicks" on the area, a software keyboard appears for the user's use in inputting the number. After inputting the activation number, the user can select link 1192 to continue the redemption process. The "card number input" screen also includes a link 1190 that can be selected by the user to quit the redemption process; a link 1188 for bringing the user to a help screen; a link 1189 for bringing the user back to the shopping channel main page of FIG. 11B; and a points indicator 1191.

Figure 11O:
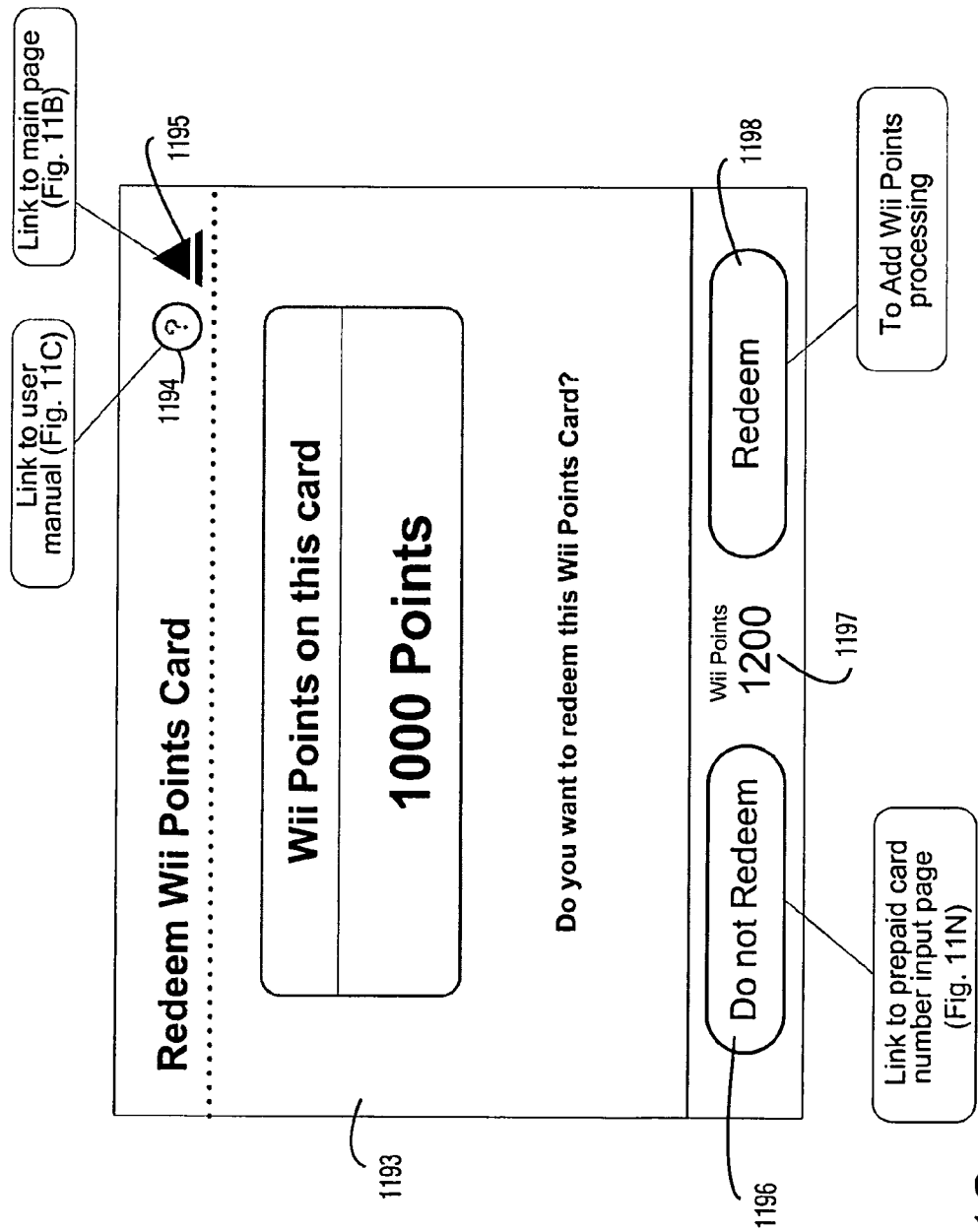

After inputting the activation number at ST 1052, the process determines at ST 1053 whether redeeming the card will result in the user's account containing more than a specified maximum number of points. If so, the process proceeds to ST 1054 and the user is informed by a display screen that the card cannot be redeemed and the process returns to ST 1052. If redeeming the card will not cause the user's account to exceed the specified maximum number of points, the process determines at ST 1055 whether the input activation number is correct. If the entered number is not correct, the process proceeds to ST 1056 and the user is informed by a display screen that the entered activation number is incorrect. The user can select a "try again" link and the process will then return to ST 1052. If the entered activation number is correct, the process proceeds to ST 1057 and a "confirm redemption" screen is displayed. A non-limiting example "confirm redemption" screen is shown in FIG. 11O. The screen includes but is not limited to information 1193 indicating the number of points on the card being redeemed. The user can redeem the card by selecting "redeem" link 1198 and the user choose not to redeem the card by selecting "do not redeem" link 1196. The "confirm redemption" screen also includes a link 1194 for bringing the user to a help screen; a link 1195 for bringing the user back to the shopping channel main page of FIG. 11B; and a points indicator 1197.

If the user selects the "redeem" link 1198, the process continues to ST 1050 and a screen is provided confirming the user's point balance. From this screen, the user may select to generate a purchase statement (receipt) in which case the process proceeds to ST 1049. After generating the receipt, the user may return to the balance confirming screen and thereafter the process continues to ST 1061.

If the user selects the "do not redeem" link 1196 from the "confirm redemption" screen of FIG. 11O, the process returns to ST 1052 where the user is prompted to input an activation code.

Various types of pre-paid cards may be used. By way of example, cards may be game-specific and allow a user only to purchase a specific video game program. By way of further example, cards may be platform-specific and allow a user to purchase video game programs for a particular platform (e.g., the NES platform). By way of still further example, cards may be character-based and allow a user to purchase video game programs featuring a certain character. By way of still further example, cards may be game-series-based and allow a user to purchase video game program from a particular series of video games.

Figure 11P:
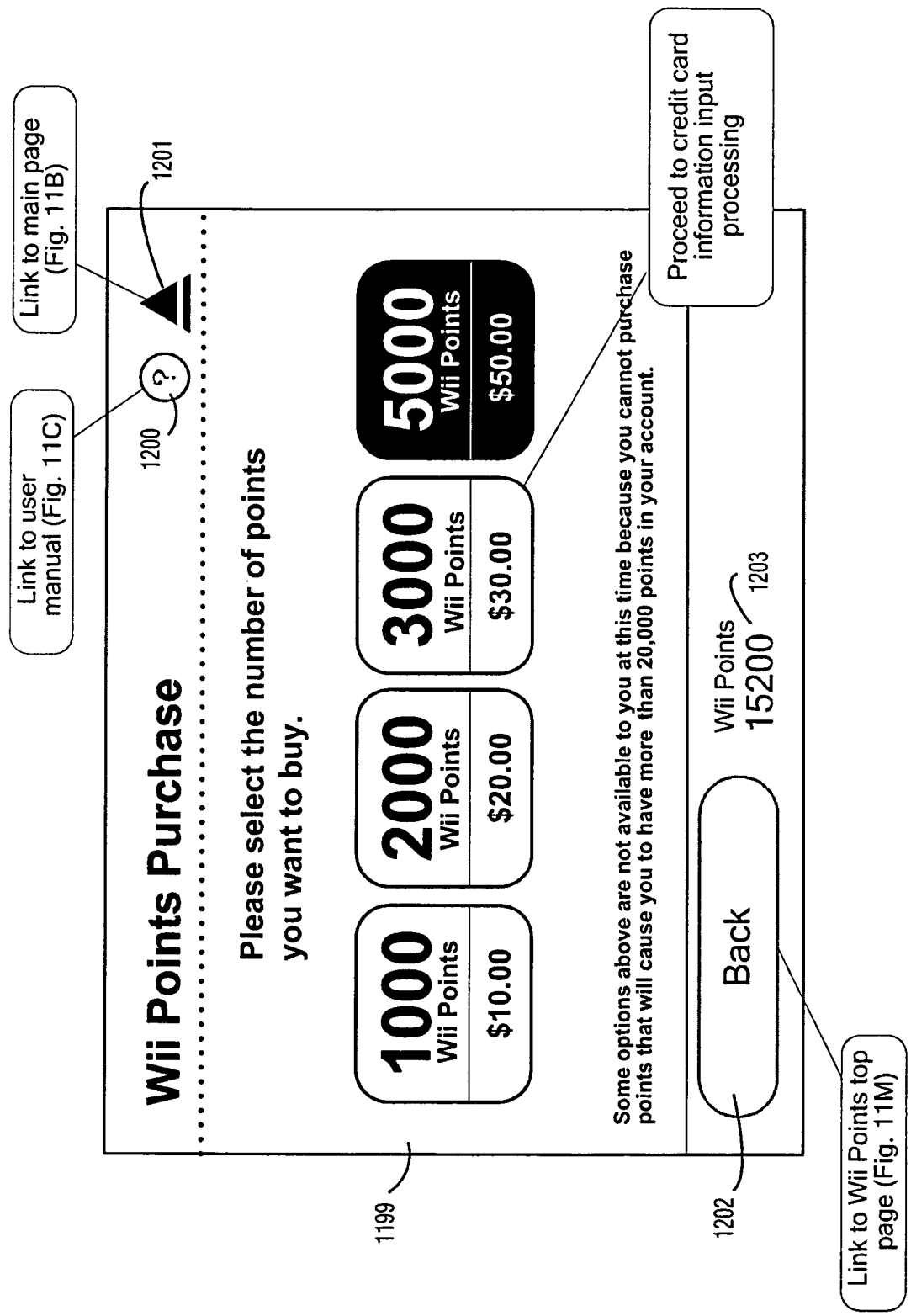

If the user chooses the credit card option at ST 1037, the process proceeds to ST 1038 and a "points selection" screen is displayed. A non-limiting example "points selection" screen is shown in FIG. 11P. As shown in FIG. 11P, the screen includes options generally indicated at 1199 allowing the user to select to purchase 1000, 2000, 3000 or 5000 points. The points indicator 1203 shows the current number of points in the user's account. Certain ones of the points options may be not be selectable by the user if the purchase of these points would cause the user's account to exceed some maximum number of points (e.g., 20000 points). In the example screen of FIG. 11P, the user has 15200 points in his or her account. Because the purchase of 5000 points would cause the user's account to exceed the maximum allowable number of points (i.e., 20000 points), the user may not select the 5000 point option. This option may be "grayed out" or simply not displayed. The screen also includes a link 1200 for bringing the user to a help screen; a link 1201 for bringing the user back to the shopping channel main page of FIG. 11B; and a "back" link 1202 for bringing the user back to the previous page.

After the user selects one of the points options from the screen of FIG. 11P, the process proceeds to ST 1039 where the user is prompted to select a particular credit card. After the user makes the credit card selection at ST 1039, the process proceeds to ST 1040 where the user is prompted to enter credit card information (e.g., credit card number, expiration date and security code) for the selected credit card. At ST 1040, the user can select a link to obtain more information about the security code (e.g., what it is, where to find it on the credit card, how the security code is used, etc.) and the process proceeds to ST 1041 where such security code information is displayed. After viewing the security code information, the user can select a "back" link to return to the credit card information entry screen. At ST 1040, the user can also select a link to obtain more information about credit card security (e.g., how credit card information is used, the details of the encryption of credit card information, how personal information is stored and used, etc.). After viewing the security information, the user can select a "back" link to return to the credit card information entry screen.

After entering credit card information at ST 1040, the user selects a link to continue and the process continues to ST 1043 and the process determines whether an address input is required. This determination may be based, for example, on the country setting. If address input is required, the process proceeds to ST 1044 and the user is presented with a credit card address input screen for inputting the billing address of the credit card. After the user inputs this information, the process proceeds to ST 1045. If no address input is required, the process proceeds directly to ST 1045 and the user does not have to enter any billing address information.

At ST 1045, the process determines whether the input credit card information is correct. If not, the process proceeds to ST 1046 and an error screen is displayed. The error screen informs the user that incorrect credit card information has been entered. The screen may further inform the user of the nature of the incorrect entry(ies). For example, the screen may indicate that the credit card has expired, that the entered billing address information is incorrect, etc. After reviewing the error screen at ST 1046, the user may select a link to return to the credit card select screen at ST 1039.

If the process determines that the input credit card information is correct at ST 1045, the process proceeds to ST 1047 and a "purchase confirmation" screen is displayed. The "purchase confirmation" screen asks the user to confirm the purchase of the points using the credit card and may include information such as the total amount of money charged to the credit card, the total number of points being purchased, any applicable taxes, and restrictions on the use of the points (e.g., they have no monetary value and cannot be redeemed for cash; the points are usable only on the user's console; the money paid for the points is non-refundable and the points are non-transferable; etc.).

If the user does not wish to complete the purchase of points and selects a "no" link at ST 1047, the process returns to the purchase point selection screen at ST 1038 (FIG. 11P). If the user selects a "yes" link at ST 1047 to complete the point purchase, the process proceeds to ST 1048 where processing authentication is performed. The user may be presented with a screen asking the user to wait while the credit card is authorized. If the credit card is authorized at ST 1048, the process proceeds to ST 1050. If there is an error in the credit card authorization, the process proceeds to ST 1049 and the user is informed of the nature of the error. After viewing the error screen, the user may return to ST 1038 where the point selection screen is displayed.

Figure 11Q:
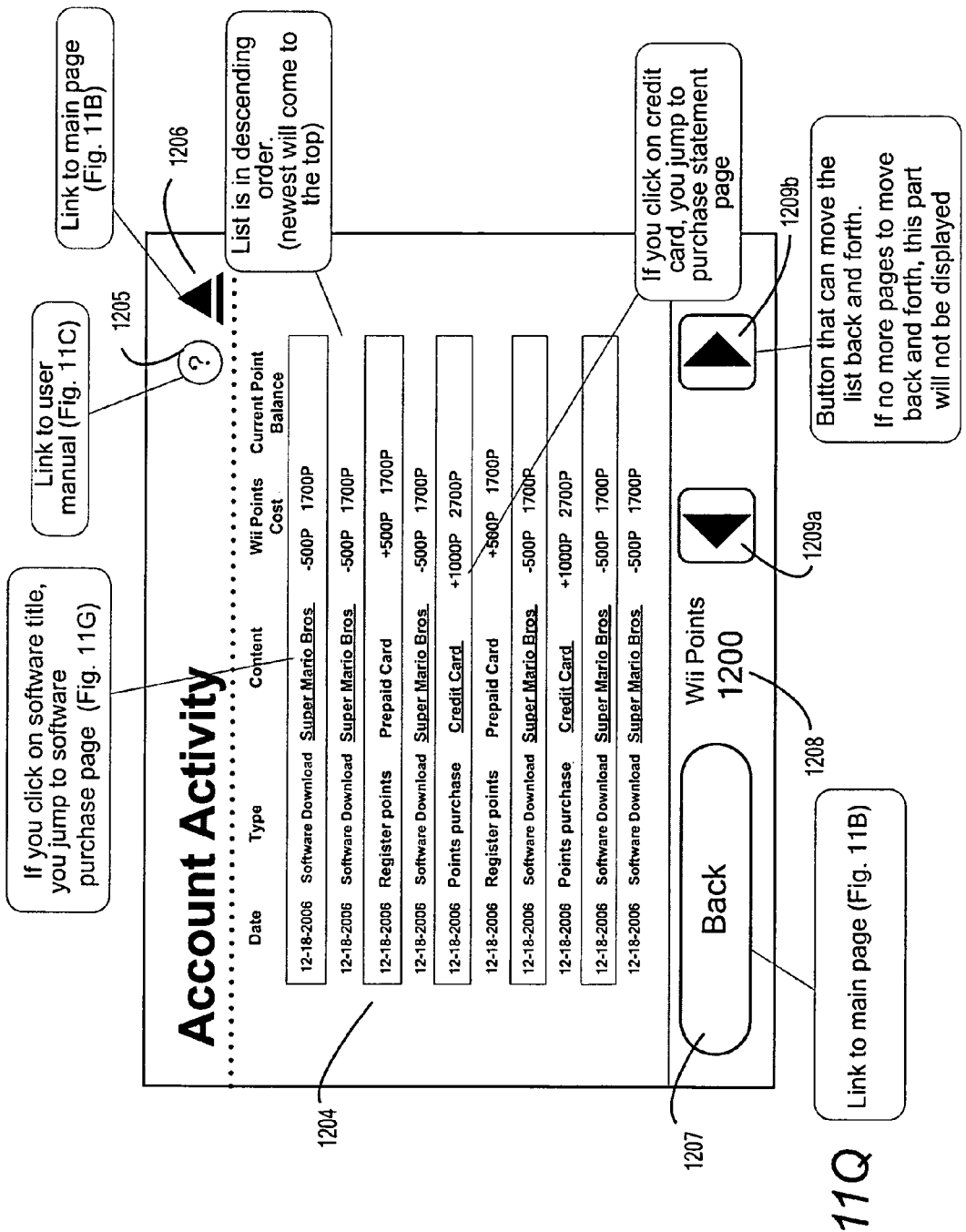

At ST 1016, the user may select link 1107 to view a record of account activity. Specifically, if the user selects link 1107, the process proceeds to ST 1058 and a usage record screen is displayed. A non-limiting example usage record screen is shown in FIG. 11Q. The screen of FIG. 11Q shows a table of events in which each event has an associated date, event type, content associated with the event, points cost of the event and points balance after the event. If the user selects one of the events, the process proceeds to ST 1059 and a purchase statement screen showing additional information associated with the selected event is displayed. The user may select a "back" link from the purchase statement screen to return to the usage record screen of FIG. 11P. The usage record screen also includes a link 1205 for bringing the user to a help screen; a link 1206 for bringing the user back to the shopping channel main page of FIG. 11B, a "back" link 1207 for bringing the user back to the previous page; and points indicator/link 108. Left and right arrows 1209*a* and 1209*b* may be used to move the different pages of the usage record.

In the above-described systems and method, a video game program can be downloaded from server 108 to a target video game platform (e.g., video game system 102). A processing system of server 108 receives a download request from the target video game platform requesting downloading of a video game program that executes on a native video game platform different than the target video game platform. The target video game platform may provide an interface that allows a user to search for and select a particular video game program for download. The download request is generated in response to the selection of the particular video game program. In response to the download request, server 108 sends the requested video game program to the target video game platform along with a program for providing compatibility between the target and native video game platforms. The program for compatibility may, for example, be an emulator.

Generally speaking, the systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program or script of instructions to perform desired functions by operating on input data and generating appropriate output. The techniques may be implemented in one or more computer programs or scripts that are executable on a programmable system including at least one programmable processor coupled to receive data and instructions from, and to transmit data and instructions to, a data storage system, at least one input device, and at least one output device. Suitable processors include, by way of example, both general and special purpose microprocessors. Generally, a processor will receive instructions and data from a read-only memory and/or a random access memory. Storage devices suitable for tangibly embodying computer program instructions and data include all forms of volatile and non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits). The computer program instructions or scripts may also be provided as data signals embodied in a carrier wave or other propagation medium via a communication link (e.g., a modem or wired or wireless network connection).

The above systems and methods are described by way of example and the appended claims are not intended to limited to these examples, but are intended to cover systems and methods including various modifications and equivalent arrangements.

We claim:

1. A video game program download apparatus configured to download a video game program to a target video game platform, the apparatus comprising at least one processor, the apparatus configured to:

generate a user interface for display on the target video game platform, the user interface displaying at least a list of one or more video game programs and, for each program in the list, a corresponding native video game platform and one or more input devices usable with video game program; and receive a download request from the target video game platform requesting downloading of a video game program that executes on a native video game platform different than the target video game platform and, in response thereto, send the requested video game program along with a program for providing compatibility between the target platform and the native video game platform.

2. The video game program download apparatus according to claim 1, wherein the program for providing compatibility comprises an emulator program.

3. The video game program download apparatus according to claim 1, wherein the apparatus comprises part of a server connected to the internet.

4. The video game program download apparatus according to claim 1, wherein the apparatus is further configured to display a warning indicating that at least one specific type of input device is required to play the respective video game.

5. The video game program download apparatus according to claim 1, wherein the user interface further displaying information related to a rating of a corresponding game in the list of one or more video game programs.

6. A video game program download method implemented in an information processing apparatus having one or more processors, the method comprising:

generating, via the one or more processors, a user interface configured to display on a target video game platform, the user interface displaying at least a list of one or more video game programs and, for each program in the list, a corresponding native video game platform and one or more input devices usable with the video game program;

receiving a download request from a target video game platform requesting downloading of a video game program that executes on a native video game platform different than the target video game platform; and in response to the received request, sending the video game program for the requested game along with a program for providing compatibility between the target platform and the native video game platform.

7. The video game program download method according to claim 6, wherein the program for providing compatibility comprises an emulator program.

8. A non-transitory computer-readable medium having computer readable code embodied therein for use in the execution in a computer of a method according to claim 6.

9. The video game program download method according to claim 6, wherein a warning is displayed indicating that at least one specific type of input device is required to play the respective video game.

10. A target video game system comprising:
an input device; and
a processing system configured to:
display information for selecting a video game program and, for each video game program, display at least one native video game system corresponding to the associated video game program and display information about one or more input devices usable with the video game program,
contact a remotely located video game source and receive therefrom, in response to a video game program selection on a user interface made using the input device of the target video game system, a video game program that executes on a native video game system different than the target video game system along with a program for providing compatibility between the target video game system and the native video game system, and
execute the received video game program and the program for providing compatibility.

11. The target video game system according to claim 10, wherein the program for providing compatibility comprises an emulator program.

12. The target video game system according to claim 10, wherein the video game source is contacted over the internet.

13. The target video game system according to claim 10, embodied as a hand-held video game system.

14. The target video game system according to claim 10, embodied as a video game console including audio and video outputs supplied to a television.

15. The target video game system according to claim 10, wherein the processing system is further configured to display a warning indicating that at least one specific type of input device is required to play the respective video game.

16. A video game program download method implemented in an information processing apparatus having one or more processors, the method comprising:

generating for display, via the one or more processors, information for selecting a video game program and, for each video game program, generating for display a corresponding native video game platform and one or more input devices usable with the video game program;

contacting a remotely located video game source;

receiving from the video game source in response to a video game program selection a video game program that executes on a native video game platform different than the target video game platform along with a program for providing compatibility between the target video game platform and the native video game platform; and executing the downloaded video game program and the program for providing compatibility.

17. The video game program download method according to claim 16, wherein the program for providing compatibility comprises an emulator program.

18. A non-transitory computer-readable medium having computer readable code embodied therein for use in the execution in a computer of a method according to claim 16.

19. The video game program download method according to claim 16, wherein a warning is displayed indicating that at least one specific type of input device is required to play the respective video game.

20. An internet-enabled video game system comprising:
an input device;
an optical disk drive configured to receive an optical disk on which is stored a video game program; and
a video game program executing system configured to directly execute the video game program stored on the optical disk, the video game program executing system configured to:
generate for display a list of one or more video game programs and, for each program in the list, a corresponding native video game platform and one or more input devices usable with the video game program; and
access a source of video game programs associated with the one or more native video game platforms and which are not directly executable by the video game program executing system and, in response to a video game selection on the user interface made using the input device, receive both a selected one of the video game programs that is not directly executable by the video game program executing system and an emulator program for enabling the video game program executing system to emulate a video game program executing system on which the selected video game is directly executable.

21. The internet-enabled video game system according to claim 20, wherein the video game program executing system is further configured to display a warning indicating that at least one specific type of input device is required to play the respective video game.

* * * * *